United States Patent [19]

Howard

[11] 4,212,483

[45] Jul. 15, 1980

[54] STEERING ASSEMBLY FOR TOWED VEHICLES

[76] Inventor: Durrell U. Howard, 306 Krameria Dr., San Antonio, Tex. 87200

[21] Appl. No.: 968,884

[22] Filed: Dec. 13, 1978

Related U.S. Application Data

[63] Continuation-in-part of Ser. No. 876,995, Feb. 13, 1978, abandoned.

[51] Int. Cl.$^2$ ............................................. B62D 13/04
[52] U.S. Cl. ................................... 280/444; 280/103; 280/447
[58] Field of Search ............... 280/446 R, 446 B, 442, 280/443, 444, 426, 447, 445, 103, 81 A, 80 R, DIG. 9, DIG. 14, 448

[56] References Cited

U.S. PATENT DOCUMENTS

| | | | |
|---|---|---|---|
| 1,756,239 | 4/1930 | Chojnacki et al. | 280/444 |
| 2,719,727 | 10/1955 | Witwer | 280/103 |
| 2,734,754 | 2/1956 | Barker | 280/103 |
| 3,105,704 | 10/1963 | Schramm | 280/443 |
| 3,393,923 | 7/1968 | Rendessy | 280/446 R |
| 3,790,191 | 2/1974 | Gallatin | 280/456 |

FOREIGN PATENT DOCUMENTS

| | | |
|---|---|---|
| 435178 | 11/1934 | United Kingdom . |
| 887577 | 1/1962 | United Kingdom . |
| 914211 | 12/1962 | United Kingdom . |
| 1069643 | 5/1967 | United Kingdom . |

*Primary Examiner*—John A. Pekar
*Attorney, Agent, or Firm*—Pollock, Vande Sande & Priddy

[57] ABSTRACT

The steering assembly disclosed has means for sensing changes in both lateral offset and angle between a towed and a towing vehicle, means for generating angle and offset signals responsive to such changes, means for combining the angle and offset signals to produce a joint steering input, and means for turning a steerable wheel of the towed vehicle in response to the joint steering input. The assembly has two operating modes, one in which offset signals and angle signals are subtracted to produce a joint steering input for forward travel of the vehicles and another in which offset signals and angle signals are added to produce a joint steering input for backing of the vehicles. The assembly also includes steerable wheel means, means for detachably coupling the vehicles together, and means for remotely shifting between the two operating modes.

42 Claims, 33 Drawing Figures

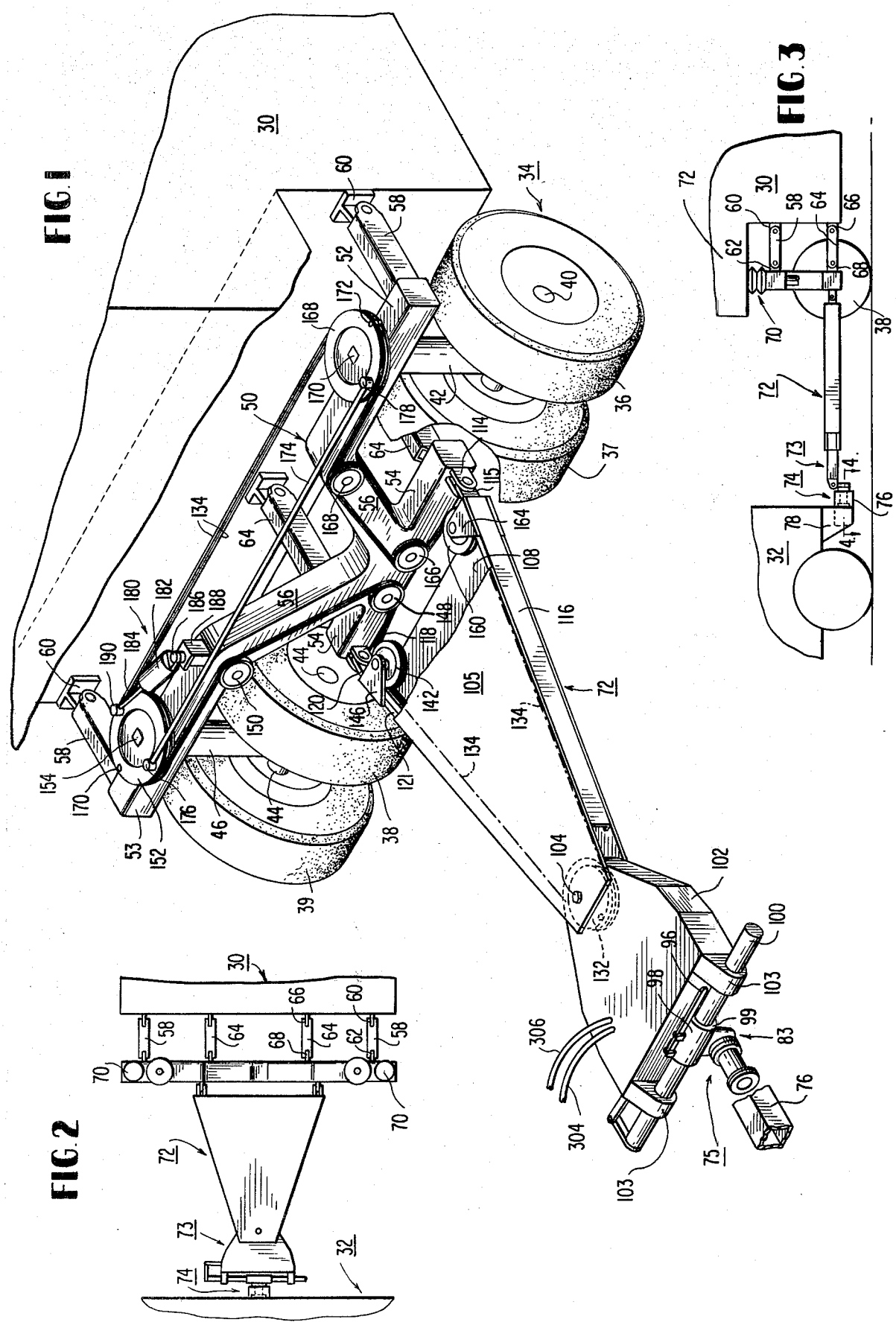

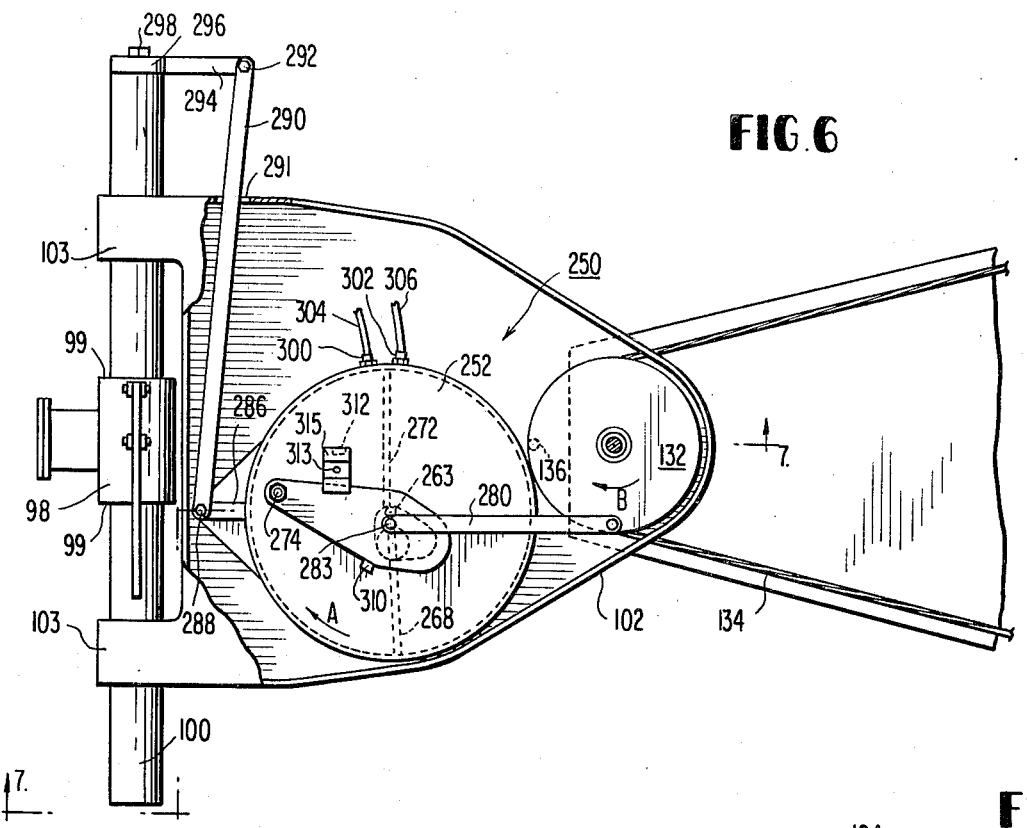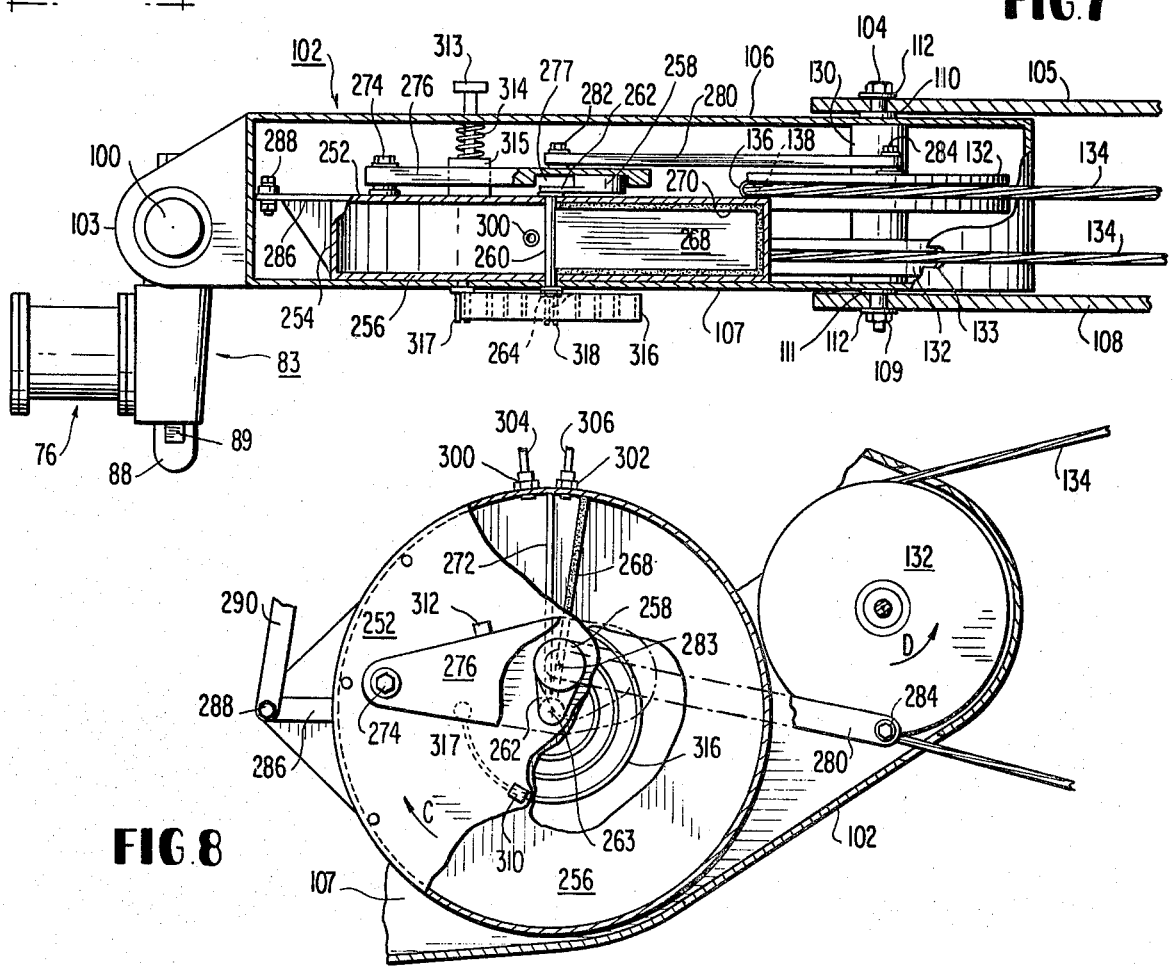

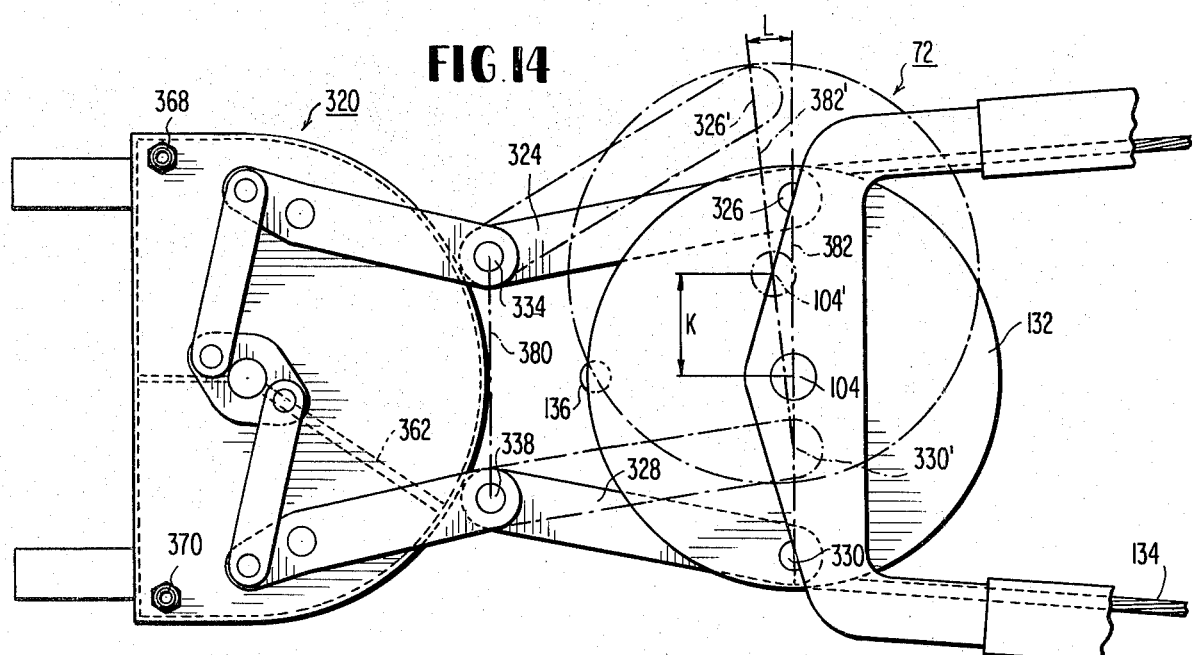
FIG.14
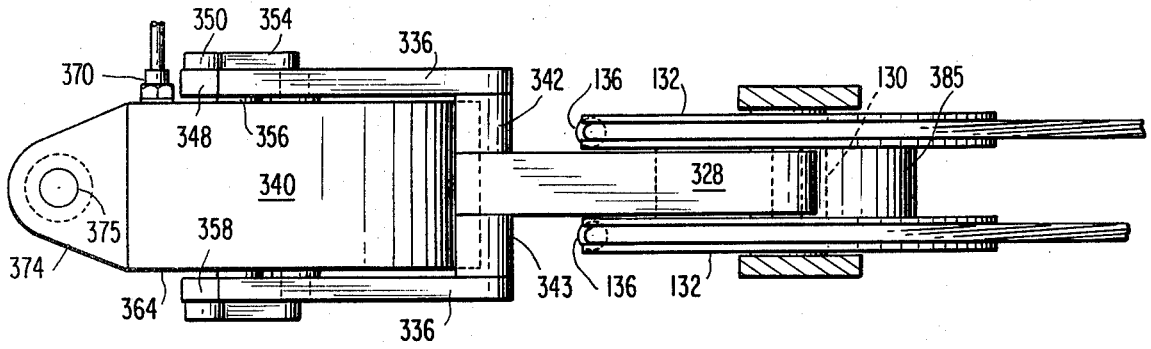
FIG.15
FIG.16

FIG.26
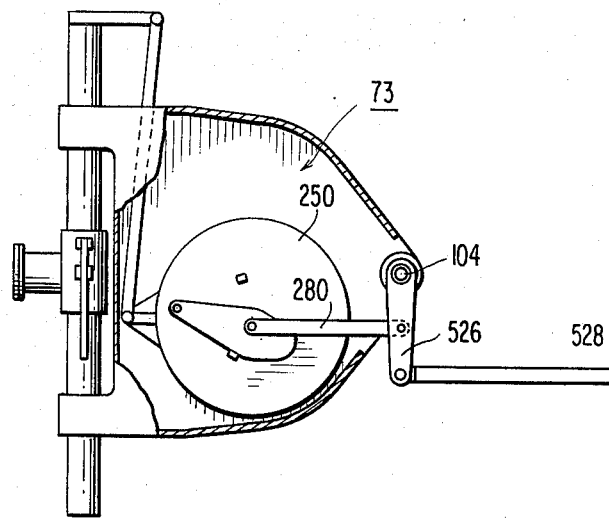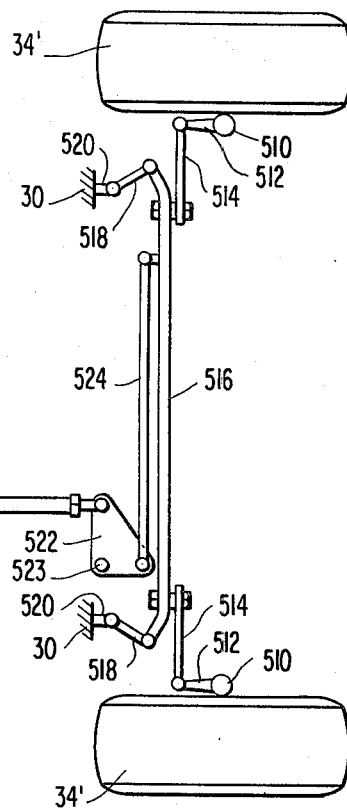
FIG.27
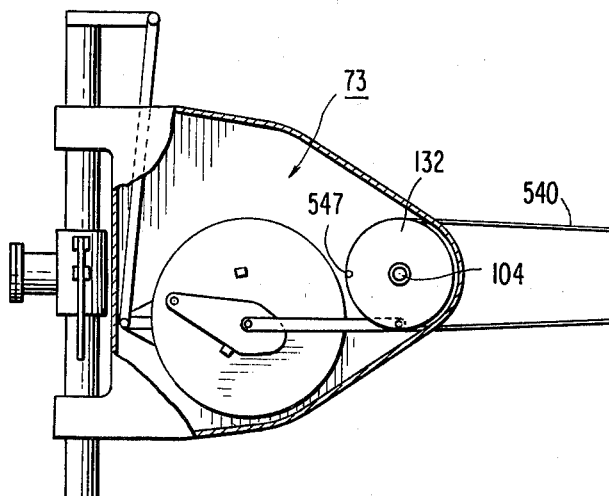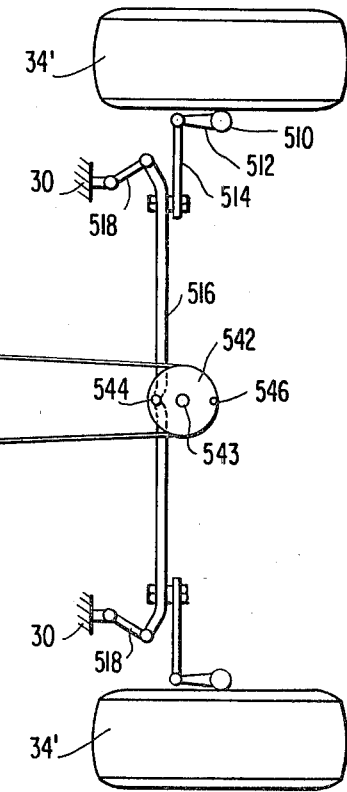

STEERING ASSEMBLY FOR TOWED VEHICLES

RELATED APPLICATIONS

This is a continuation-in-part of application Ser. No. 876,995 filed on Feb. 13, 1978, now abandoned, entitled "Split-Axle Trailer Towing System."

BACKGROUND OF THE INVENTION

This invention relates to a towing mechanism for connecting a towed vehicle to a towing vehicle and, more particularly, to an improved steering assembly for towable vehicles having steerable front wheels. Without any intention of restricting the broad scope of the invention, the towed vehicle will sometimes be referred to as a trailer and the towing vehicle as an automobile, the invention being especially useful for a combination of such vehicles.

It is well recognized that when a towed vehicle, such as a travel trailer, is towed behind a towing vehicle, such as a car or truck, there is a tendency of the towed vehicle to sway when traveling at highway speeds, thus causing a hazardous or dangerous driving condition. This condition may be aggravated by uneven roadbeds, sudden turns by the towing vehicle, and air buffeting caused by gusty winds or large passing vehicles traveling at high speeds. Prior to the present invention, the inventor therefore investigated the stability of many different types of towed vehicles.

Three types or "degrees" of rotational movement are needed between the towing and towed vehicles for the combination to travel over uneven road surfaces and execute turns. The three degrees of movement are called pitch, roll and yaw and correspond to the three axes about which relative movements are permitted between the towing and towed vehicles, namely, rotation about a horizontal lateral axis (pitch), about a horizontal longitudinal axis (roll) and about a vertical pivot axis (yaw). While the direction of these axes may vary to some extent within the design and mechanical tolerances employed in towing devices, the yaw axis is substantially vertical and the pitch and roll axes are substantially horizontal.

Conventional two wheel, center-axle trailers usually use a trailer hitch comprised of a single tongue or tow bar rigidly connected at one end to the forward frame of the towed vehicle and detachably connected at the other end to the towing vehicle by a ball joint. The ball joint is usually mounted on a frame supported member at or near the rear bumper of the towing vehicle. This ball joint connection provides, at least to a limited extent, the three degrees of rotational movement referred to above. Thus, the effective pivot point between the towing vehicle and a center-axle trailer with a conventional hitch is at the ball joint, which is usually located a substantial distance behind the rear wheels of the towing vehicle. As a result, a large lever arm exists between the pivotal connection and the center of gravity of the towing vehicle. Consequently, a significant force is applied to the towing vehicle by the towed vehicle when the vehicles are rounding a curve which tends to displace or sway the towing vehicle to one side. This upsetting force may also occur with other changes in angle between the longitudinal axes of the two vehicles during forward surge of the trailer while traveling down a steep hill or braking. Control over both vehicles may thus be reduced and in some cases lost.

Center-axle trailers are usually manageable as long as the ratio of trailer to automobile weight is favorable. The automobile ideally should be heavier than such trailers by a ratio of 2 to 1. As the trailer to automobile weight ratio becomes equal, or the trailer becomes heavier than the automobile, the dynamic forces of the trailer begin to override the inherent stability of the towing vehicle. Although there have been many attempts in the prior art to increase the stability of this combination, there are unfortunately many unsuitable devices and combinations being used as evidence by the high accident rate among automobiles and other relatively light vehicles while towing heavy trailers. Such prior art devices are just not able to provide the needed anti-sway control at highway speeds and permit dynamic oscillations of the loading of the trailer and of the towing vehicle to become synchronized in an adverse phase relationship. When this happens, the forces of instability multiply rapidly and are often greater than either the device itself or the driver of the towing vehicle is able to control. In fact, the efforts of even the most experienced driver under these conditions often aggravate the situation by contributing to the adverse phase relationship.

As speed increases, only small changes in steering angle or in the angle between towing and towed vehicles are required to produce large upset forces. Above a certain speed or crossover point, dynamic oscillations in an adverse phase relationship can increase those forces to a level that cannot be controlled. Once the automobile and the trailer are traveling beyond the safe speed for which directional control can be maintained by the driver, it takes very little to set such an adverse oscillation into motion. Dynamic instability may be initiated by gusty cross winds, changes in the road surface, rapid lane changes, curves in the roadway, or a flat tire or blow out.

Instability of the combination is often aggravated by improper loading of the trailer which can shift its center of gravity to an even more adverse location and bring on uncontrollable oscillations at an unsuspectingly low speed. With center-axle trailers, the amount of tongue weight applied to the rear of the towing vehicle is critical to the stability of the combination. This requirement of a particular tongue weight puts considerble constraints on the manner of loading such towed vehicles.

The disadvantages of the center-axle trailer may be overcome in part by employing a four wheel trailer with separate or "split" axles, one near the front and the other near the rear of the trailer. This arrangement has the advantage that the front axle of the trailer carries substantially all of the weight of the front of the trailer such that considerably less attention need be given to weight distribution inside the trailer. The four wheel trailer also provides a more stable unit since a four point suspension is utilized as opposed to a three point suspension, one of which is the rear of the towing vehicle. Lever arm forces are also reduced with the four wheel trailer which includes front wheels that can be steered to follow the towing vehicle.

A towable split-axle trailer conventionally includes a tow bar or the like with one end connected to the towing vehicle and the other end connected to steering apparatus operable to impart steering movements to the trailer's steerable front wheels. One conventional form of steering mechanism for such trailers is known as the "Ackerman" steering system. The term "Ackerman" as used in this specification refers to the automotive type system utilizing steering spindles or knuckles pivotally mounted upon king pins carried by a frame or axletree and connected by bell crank and tie rod linkages. A single wheel on each side has an individual axle mounted upon a corresponding knuckle and steerable independently of the axletree. This system does not permit the wheels to have a turning angle of more than about 45 degrees. Sometimes the towing vehicle must make an exceptionally sharp turn beyond the steering capability of the Ackerman system and it is not uncommon in such instances for the steering mechanism to be broken or subjected to severe damage.

One way in which the prior art obtains a greater degree of turning maneuverability for split-axle trailers is to provide the trailer with a fifth wheel type of turning mechanism. These trailers are guided like a farm wagon where the entire front axle and wheel assembly is mounted upon a lubricated, rotatable plate resembling a fifth vehicle wheel so that the angle of the axle changes relative to the longitudinal axis of the trailer. The trailer is guided by moving the front axle so as to change its angle with respect to the longitudinal axis of the trailer. This is referred to as axle steering and the change in angle produces what is referred to herein as angle steering. This construction provides a stable trailer with steerable wheels that can be turned over 90 degrees to either side of center. However, the steerable wheels are unable to move independently and this can cause tire scuffing when traveling over uneven road surfaces. Although the stability of these trailers in forward tow is usually quite good, unstable oscillations may develop if the vertical pivot connections are loose or the fifth wheel does not pivot freely due to improper lubrication. Trailers of this type also have a marked tendency to jackknife under surge forces resulting from braking or downhill travel of the towing vehicle.

Many conventional trailer steering devices are also deficient in that the trailer will either go wide of the path of the rear wheels of the towing vehicle or cut inside of that path on turns. Such movements are undesirable in that they cause scuffing of either the automobile or the trailer tires, depending upon which vehicle has the greater weight. Such action can also lead to unstable oscillatory motions between the two vehicles at highway speeds. It is therefore desirable that the trailer wheels closely track the rear wheels of the towing vehicle in forward travel without imposing transverse forces on the rear of the towing vehicle.

Another prior art device is the semi-trailer rig where the trailer is attached over the rear wheels of the tractor and uses those wheels for its front wheels. This unit is inherently stable, meaning that the dynamic forces of the trailer do not upset the inherent stability of the towing vehicle. In the forward direction, the semi-trailer will obviously follow the tractor because the rear tractor wheels form the front guiding or steering wheels of the trailer. Similarly, upon backing, all steering is accomplished by an angle change between the tractor and the trailer such that the rig can easily be backed by the driver steering the tractor for the proper angle change of the tractor's rear wheels to steer the trailer in the desired turning direction. With the vertical pivot axis at or near the center of the rear axle, the dynamic forces of the trailer under most conditions, except skidding of the tractor as discussed below, have practically no adverse effect on the directional stability of the tractor. Because of this stability and its complete freedom of maneuverability, the tractor semi-trailer rig has become the standard of the commercial trucking industry and enjoys the reputation of being the most stable and manageable of all methods of hauling a towed vehicle outweighing the towing vehicle by several times.

It has thus been recognized that the stability and backing control of center-axle trailers are improved by attaching the trailer to a point over or slightly forward of the driving rear axle of the towing vehicle by a fifth wheel connection similar to that used in axle steering. In this system, the towing vehicle must be specially modified to carry the fifth wheel in a manner similar to the tractor of the semi-trailer rig. Such trailers have been connected to the bed of pickup trucks at a position either above or slightly forward of the rear axle by means of a fifth wheel connection known as a "gooseneck".

When connecting a trailer to an automobile or other fully enclosed motor vehicle, the space above or in front of the rear axle is often unavailable or inconvenient for attachment of a trailer. While a fifth wheel therefore provides an improved measure of stability and handling, its utility is limited to specially designed towing vehicles. The convenience of connecting and disconnecting a towed vehicle from the rear end of a motor vehicle has lead to the almost universal attachment of trailer hitches at or near the rear bumper of automobiles. Furthermore, while the fifth wheel connection is relatively stable during towing, it has a tendency to jackknife during braking.

It is also known in the prior art to use pivotal linkages between the towing and towed vehicles. One such connection is shown in U.S. Pat. No. 4,019,754 to Hinckley. However, such prior art devices merely create an apparent vertical axis for pivotal movement forward of the linkages in an effort to simulate a hitch connection at that location. Pivotal movement around that location can cause the trailer to cut inside the path of the towing vehicle when turning. The turning radius is also limited by the angle of pivot available behind a towing vehicle using such a hitch mechanism.

Another deficiency with prior art devices, even the fifth wheel connection, is that every lateral force, both large and small, is transmitted directly from one vehicle to the other. Small maneuvers of either vehicle at highway speeds can therefore initiate oscillations in the other vehicle which may result in a resonating interaction making the combination unstable. It is therefore highly desirable to prevent lateral forces from being transferred between vehicles at highway speeds.

A further problem with prior art trailer steering devices is that relative movement between the two vehicles about the pitch axis introduces an undesirable turning input to the wheels through the steering linkages.

The prior art has also employed positive caster to stabilize steerable wheels both on towing and towed vehicles. Positive caster of the trailer wheels in the forward direction produces negative caster in the rearward direction. Negative caster during backing of a split-axle trailer can result in adverse steering inputs which are difficult to control and may cross up the trailer steering assembly. If backing is continued after such cross up, the steering assembly can be severely damaged.

SUMMARY OF INVENTION

Such disadvantages and limitations of the prior art are overcome by the trailer steering assembly of the present invention. As previously indicated, the semi-trailer rig has a vertical pivot axis only in one place, namely, over the center of the tractor's rear axle. However, many steerable trailers, particularly those with axle steering, have two vertical pivot axes, one at or near the front trailer axle and the other at the point where the tongue attaches to the rear of the towing vehicle (yaw axis). Applicant has recognized that those two pivot points make it possible for the longitudinal axis of such trailers to become offset either to the right or left of the longitudinal axis of the towing vehicle. The angle between those axes also changes during turning or other rotational movements of the two vehicles about the yaw axis. As used in this specification, offset change refers to the relative lateral movement or change in lateral distance between those two axes and angle change refers to the change in the angle between those two axes about the yaw axis. Similarly, offset input refers to the steering signal generated by offset change and angle input refers to the steering signal generated by angle change.

The present invention utilizes both the angle and offset changes between the longitudinal axis of a towing vehicle and the longitudinal axis of a towed vehicle to provide signals for steering the latter while traveling in either direction. In forward travel, the steering inputs are such that the combination unit will remain in a straight line with the longitudinal axes of the vehicles in alignment except during momentary directional upsets or turning movements. Upset forces in the form of lateral movement of either vehicle are prevented from reaching the other vehicle, thereby avoiding the possibility of resonant oscillations which could lead to instability of the combination. Lateral offset between the two vehicles automatically steers the towed vehicle back into alignment with the towing vehicle.

In initiating a backward turning maneuver, the front wheels of the towing vehicle must first be turned in one direction to initiate turning movement of the trailer in the direction desired and must then be turned in the opposite direction to follow the turning path of the trailer. Applicant has recognized that in backing a split-axle trailer with a connection allowing offset, the longitudinal axis of the towing vehicle is offset from that of the trailer by a relatively large amount during initial backward travel. The magnitude of this offset is proportional to the distance between the yaw axis at the rear of the towing vehicle and its rear axle, a distance that is substantial for most automobiles. With conventional steering assemblies, this offset makes it practically impossible to back the trailer without jackknifing or crossing up the towing connection. In rearward travel, the steering inputs of the present invention are such that backing movement of the towed vehicle is easily controlled and crossing up or binding the trailer steering assembly is avoided.

The present invention in its preferred embodiments includes means for providing the usual three degrees of relative movement between the towing and towed vehicles such that the combination can travel over uneven road surfaces without damage to either vehicle or the steering mechanism. A novel steering mechanism also provides a fourth degree of relative movement, namely, linear offset of the tow bar. Linear offset is lateral movement of the tow bar center line relative to the longitudinal axis of the towing vehicle and is equal to the offset change between the longitudinal axes of the towing and towed vehicles in the embodiments shown in the drawings. Linear offset movement is to be distinguished from rotational movement of the tow bar in response to that offset which can occur between vehicles connected by a tow bar having two vertical pivot axes, one connecting its front end to the towing vehicle and the other connecting its rear end to the towed vehicle. Therefore, an important feature of the invention is that offset changes are provided for in a steering assembly having one vertical pivot axis instead of two, the rear tow bar to trailer connection being rigidly secured against pivotal movement in the horizontal plane.

The mechanism has two different operating configurations, a forward mode for forward towing and a reverse mode for backward pushing of the trailer. In the forward mode, the assembly utilizes relative movement between the two vehicles to steer the trailer so as to follow closely the path of the rear wheels of the towing vehicle. In the reverse mode, any change in offset between the two vehicles during backing provides an immediate and relatively large steering input to the trailer. This input is needed because the steerable trailer wheels must turn through a relatively large angle in response to small offset and angle changes in order to properly initiate a rearward turning movement and keep the trailer properly aligned so as to follow the radius of the turn ahead of the towing vehicle. In other words, trailer steering is highly sensitive to offset in the reverse mode. In this way, the front wheels of the trailer are steered when backing so as to precede the rear wheels of the towing vehicle.

The front wheel assembly of the trailer preferably employs two pairs of wheels, each pair mounted for rotation upon a separate substantially horizontal axle. Each axle is mounted upon a corresponding spindle for turning movement about a substantially vertical axis, one spindle being mounted near one forward corner of the trailer body and the other being mounted near the other forward corner. The two wheels of each pair thus mounted so as to swivel about the same vertical axis will be referred to in this specification as bogie wheels. Each pair of bogie wheels is independent of the other pair so that wheels on opposite sides of the trailer can rotate at different speeds as dictated by different turning radii. This reduces one cause of tire scuffing, namely, forcing a tire to traverse an arc other than that of its turning radius. Such wheel mountings are also compatible with an independent suspension system on each side which reduces the tendency of the tires to scuff during travel over uneven roadways.

Two primary embodiments for the steering mechanism of the invention are disclosed. Both embodiments include a steering member rotatably mounted upon the two bar assembly. The steering member is connected to each spindle for turning the front wheels of the trailer. The front wheels may be connected to the steering member by a flexible cable and pulley system or by a bell crank and push-pull system, or by a combination of such hardware.

The steering assembly of the first embodiment employs a sliding bar steering mechanism for transmitting offset steering inputs to the steering member. One of the main features of this mechanism is a transverse bar attached to the towing vehicle and upon which the steering mechanism housing is free to move in the lateral direction in response to offset between the towing and towed vehicles. An offset actuator is rotatably mounted upon the housing and is connected to the transverse bar whereby linear offset is converted into rotary motion of the actuator. The actuator in turn is connected to the steering member to which it transmits rotational movement. A rotational steering input due to offset is thereby transmitted to the spindle for turning of the trailer wheels.

The steering mechanism housing is pivotally connected to the two bar assembly about a pivot pin having a substantially vertical axis. The axis of the pivot pin corresponds to the vertical yaw axis about which the two vehicles move relative to each other when the angle between their longitudinal axes changes in the horizontal plane. In the preferred embodiment, the steering member is also mounted for rotation about the same pivot pin. The steering member is connected between the towing and towed vehicles such that the member will generate a steering input proportional to the angle between the longitudinal axes of said vehicles and thereby turn the wheels in response to changes in that angle.

A second embodiment of the offset actuator is disclosed wherein the steering member is connected to the towing vehicle through a pair of elongated pivoting links, one on each side of a center line parallel to the longitudinal axis of the towed vehicle. The links are pivotally connected both to the towing vehicle and to the steering member and the connection is such that the steering member rotates relative to the towed vehicle in response to both angle and offset changes between the longitudinal axes of the vehicles.

The forward mode position of both the slide bar and pivoting link mechanisms is such that the offset and angle inputs are subtractive for turning movement in a given direction in the absence of other upset forces. This means that the offset and angle changes produce steering signals of opposite sign, i.e., in opposite directions, with the net turning input being the difference between offset input and angle input. Upon initiation of a slow speed turn, offset tends to cancel the first 3 to 5 degrees of angle turn so that the trailer wheels remain relatively straight over the first few feet of travel. Angle steering then takes over to steer the trailer so that its front wheels follow the path of the rear wheels of the towing vehicle. The trailer is therefore guided principally by angle steering at low speeds. However, at high speeds, the trailer is guided principally by offset steering because only small angle changes are required to produce rapid lateral movements and correspondingly large offset inputs. Such speed sensitivity requires a relatively slow offset steering to turning ratio in forward mode, 1 inch of offset preferably generating ½ to 1 degree of wheel turn.

The backing mode position of both steering mechanisms is such that the offset and angle inputs for a given turning movement are additive. Furthermore, a relatively high offset steering to turning ratio is used, making trailer steering highly sensitive to offset inputs during backward travel. It has been found that high sensitivity to offset will turn the trailer wheels sharply during the first few feet of backward turning movement. This immediately moves the trailer into the proper position for a controlled turn and prevents the towing vehicle from overriding the trailer and crossing up the steering mechanism. A preferred offset steering ratio for the backing mode is 2 to 3 degrees of wheel turn per inch of offset.

It is therefore an object of the invention to provide an input to steerable trailer wheels proportional not only to the angle between the axes of a towing vehicle and the trailer, but also proportional to the distance that those axes are laterally offset relative to each other. Furthermore, these inputs are used not only to guide the trailer in the forward direction but also to give it positive guidance in the rearward direction for backing, a feature seldom if ever found in trailer steering devices of the prior art.

Another object of the invention is to provide the stability necessary for an automobile to tow heavy trailers with an unfavorable trailer to car ratio, namely, greater than 1 to 1. With the present invention, the trailer has its own stability independent of the automobile or other towing vehicle and itself resists external upset forces, whether induced by the roadway, passing vehicles, atmospheric conditions, or the driver's own oscillation of the towing vehicle. If any offset results, the geometry of the steering mechanism automatically returns the trailer to its center position in alignment with the center line of the towing vehicle. Thus, the towed vehicle will not cause or contribute to a skid of the towing vehicle, and the tendency of such combinations to jackknife is significantly reduced. In this respect, the stability of the combination is superior to that of the fifth wheel connection between a tractor and semi-trailer. By mechanically and precisely steering the trailer at all times instead of physically horsing it about, tire scuffing, sway and fish tailing are virtually eliminated in both forward and backing maneuvers, and the trailer is prevented from going either wide or cutting inside or turning maneuvers.

When executing turns, the steering inputs from the novel steering assembly produce trailer movements in both forward and backing travel as if the front trailer wheels were the rear wheels of a tractor employing a fifth wheel connection. The present invention thus simulates the turning movements and stability of a tractor-trailer rig with the added advantage that the tendency to jackknife is reduced.

Although an Ackerman-type steering system may be employed, the turning angle is thereby limited to plus or minus 45 degrees. However, with the cable and pulley embodiment disclosed, turning angles greater than 90 degrees may be achieved as long as the tow bar and related assemblies are designed to avoid contact between the two vehicles at such large turning angles.

The bogie type assembly with one wheel mounted on each side of the steering spindle provides a balance between the frictional forces generated as the tires contact the road surface. In addition, the rotation of these two wheels on a common axle provides a stabilizing influence by opposing centrifugal and other lateral forces tending to turn the wheels from their straight ahead position. The towed vehicle of the present invention therefore has a strong directional memory equivalent to that of a tractor-trailer rig.

Positive castering of the wheels in the forward direction may also be provided by inclining the axis of each spindle so that it intersects the road surface forward of the point of ground contact by the wheels. Such positive castering is usually a few degrees, preferably three. With the point of ground contact behind the apparent point of spindle rotation at ground level, the frictional forces between the tires and road surface resist wheel turning more strongly and further enhance their directional memory. The steering inputs provided by the invention for backing readily overcome the resulting negative caster of the wheels in the rearward direction.

The steering connections between the steering assembly and the steerable wheels of the towed vehicle are located substantially along the pitch axis of the tow bar so that no significant steering function is introduced by relative vertical motion between the towing and towed vehicles, whether caused by uneven road surfaces or otherwise.

The invention provides a relatively simple and economical trailer steering apparatus of a highly reliable character. Means are included for shifting the steering apparatus to its reverse mode from a remote position within the passenger compartment of the towing vehicle and for automatically returning all components to their forward mode position prior to commencement of forward vehicular travel. Means are also provided for locking the mechanism in its forward mode to insure safety at highway speeds. The apparatus can be installed on existing vehicles and aligned relatively easily as compared to many prior art steering mechanisms for trailers.

The invention has many additional objects, only some of which are set forth above. Numerous other objects and advantages of the invention will be apparent to those skilled in the art from this specification and the attached drawings.

BRIEF DESCRIPTION OF THE DRAWINGS

The invention, both as to its structure and method of operation, may be further understood by reference to the detailed description below taken in conjunction with the accompanying drawings, in which:

FIG. 1 is a perspective view of the overall steering assembly of the present invention as mounted between a towed vehicle and a towing vehicle (not shown).

FIG. 2 is a plan view of the overall steering assembly shown as connecting fragmentary portions of a towing and a towed vehicle.

FIG. 3 is a side view of the overall steering assembly shown as connecting fragmentary portions of a towing and a towed vehicle.

FIG. 6 is a plan view of the steering mechanism of the invention with the mechanism housing in fragmentary section.

FIG. 7 is an elevational view of the steering mechanism in section taken along lines 7—7 of FIG. 6.

FIG. 8 is a plan view of certain components of the steering mechanism in fragmentary section.

FIG. 14 is a plan view of a modification of the steering mechanism of the invention showing the modified mechanism in its forward mode.

FIG. 15 is a plan view showing the modified mechanism of FIG. 14 in its reverse mode.

FIG. 16 is a side view of the modified steering mechanism of FIG. 14.

FIG. 26 is a plan view illustrating one alternate embodiment of linkages for transmitting steering inputs from the steering mechanism to the front trailer wheels.

FIG. 27 is another alternate embodiment of linkages for transmitting steering inputs from the steering mechanism to the front trailer wheels.

DETAILED DESCRIPTION OF THE INVENTION

Introduction

Figure 9:
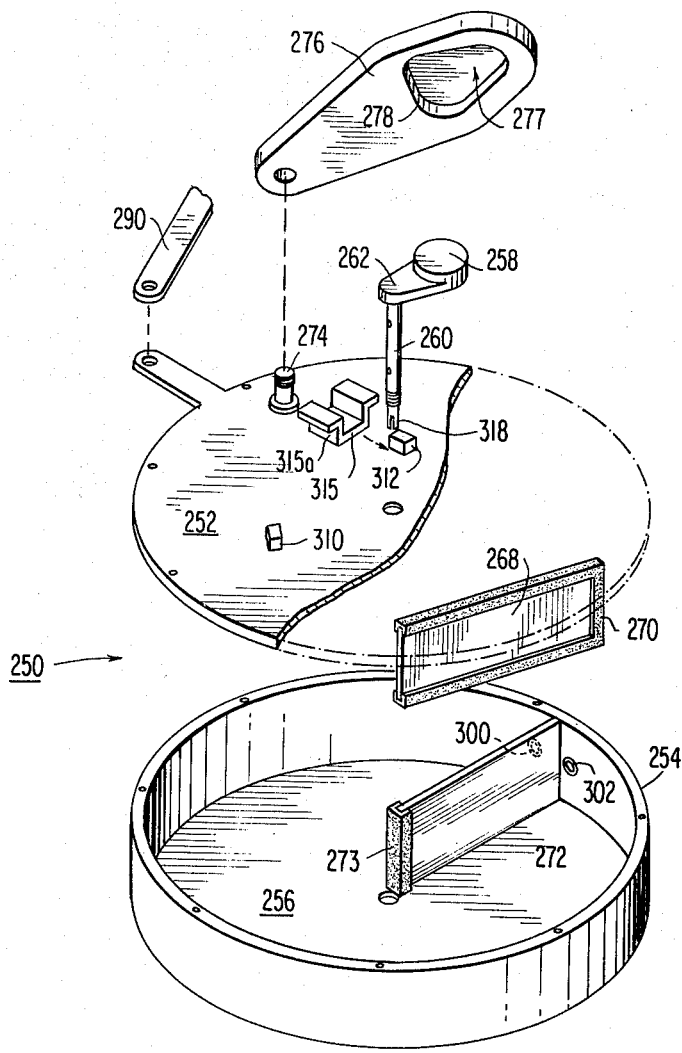
FIG. 9 is an exploded view of a mode shifting component of the steering mechanism.

Referring to FIGS. 1, 2 and 3 of the drawings, there is shown one embodiment of the present invention connecting a towed vehicle 30 to a towing vehicle 32. The towed vehicle 30 is of the split-axle type with a front wheel assembly, generally designated 34, and a separate rear wheel assembly (not shown). The front assembly has a pair of wheels 36-37 beneath the left front corner and a pair of wheels 38-39 beneath the right front corner of the towed vehicle. Similarly, the rear wheel assembly has one or more wheels mounted near each rear corner of the towed vehicle, usually upon a single rear axle. Such a split axle arrangement is capable of providing stable support for large trailer loads. As will be apparent from the subsequent description, the steering assembly of the present invention gives the towed vehicle such inherent stability that even a heavily loaded trailer will not adversely affect the stability of the towing vehicle.

Front Wheel Assembly

The front wheels 36-37 are rotably carried by an axle 40 which in turn is carried for pivotal turning movement by a substantially vertical spindle 42. Similarly, the front wheels 38-39 are rotably carried by an axle 44 which in turn is carried for pivotal turning movement by a substantially vertical spindle 46. The spindles 42 and 46 are mounted for rotation about their longitudinal axes on an axletree, generally designated 50, the bearings (not shown) being carried for spindle 42 by the left upper arm 52 and for spindle 46 by the right upper arm 53 of the axletree. Although independent bearings can also be used for separately mounting each wheel on its axle, it is preferable to rigidly secure wheels 36 and 37 to axle 40 and wheels 38 and 39 to axle 44 and to rotably mount those axles in bearings carried by the corresponding spindles. Additional stability is thereby achieved because two wheels in contact with the ground and rotating together on a common shaft tend to resist turning from a given path of travel. The resistance is due to the forces created when such wheels try to traverse turning arcs of different radii while rotationally tied together. Although some tire scuffing may occur when steering through turns, it is minimized by the close proximity of the wheels on the common axle and is outweighed by the increased stability achieved. Further stability is achieved by mounting each spindle with the upper end rearwardly of the lower end so that its longitudinal axis is tilted a few degrees to give positive castering in the forward direction as discussed above.

The axletree also includes a pair of lower arms 54-54 which are joined to the upper arms 52 and 53 by a pair of slanted interconnecting runs 56-56 merging at their base to form the V-shaped axletree structure shown. The upper arms 52-53 are connected to the trailer body 30 by a pair of supports 58-58 pivotally connected at the rear end to a mounting bracket 60 and at the forward end to a mounting bracket 62. The lower arms 54-54 are similarly connected to the trailer body by a pair of supports 64-64 pivotally connected at the rear end to bracket 66 and at the forward end to bracket 68. The pivot axis of each of these supports is such as to permit up and down movement of the front wheels relative to the trailer body as the wheels travel over uneven roadway surfaces. The extent of such relative movement is controlled by a pair of suspension assemblies 70—70, one mounted at each end of the axle tree between its upper surface and an overhanging portion 72 of the trailer frame. The suspension assembly may be of any conventional type, such as coil or leaf spring, air bag, elasomer, pneumatic, hydraulic or a combination thereof.

It is to be understood that the trailer body need not overhang the front wheels of the trailer, but that the mounting structure provided by the overhang can be replaced by frame members running from the front of a trailer body to upper ends of the suspension assemblies.

The rear trailer wheels do not constitute a part of this invention but may be mounted in either conventional fashion or by an axletree structure similar to that shown for the front wheels of the invention. Rear trailer wheels are usually mounted on a single axle spanning the trailer body transversely and may comprise either two or four wheels depending on the gross weight of the trailer.

The Towing Connection

Referring to the major components generally as shown in FIGS. 1, 2 and 3, the front wheel assembly 34 is connected to the towing vehicle through a tow bar 72, a steering mechanism 73, and a hitch coupling mechanism 74. More specifically, the coupling 74 includes a swivel 75 mounted within a supporting beam 76 connected to the frame 78 of the towing vehicle 32 as illustrated in FIGS. 1 and 3. The beam 76 may be a conventional trailer tow bar receptacle mounted on the rear frame of an automobile.

Figure 5:
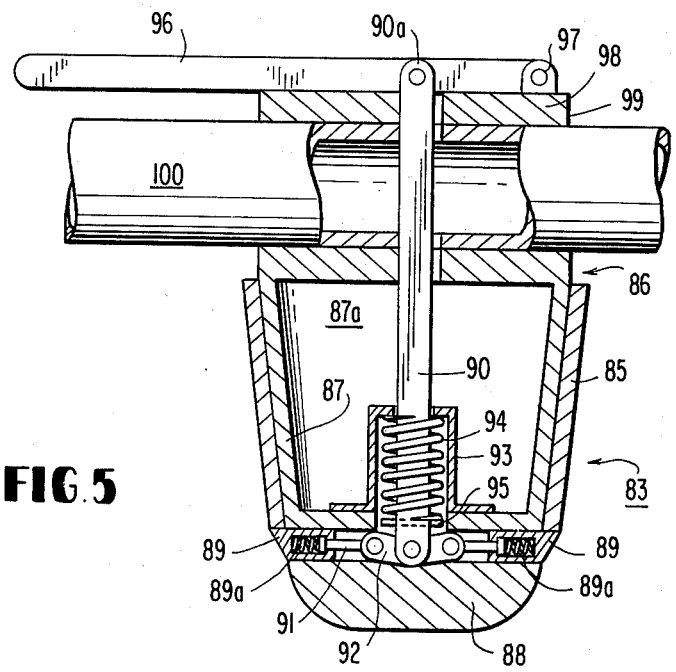
FIG. 5 is a sectional view of the hitch coupling mechanism taken along lines 5—5 of FIG. 4.
Figure 4:
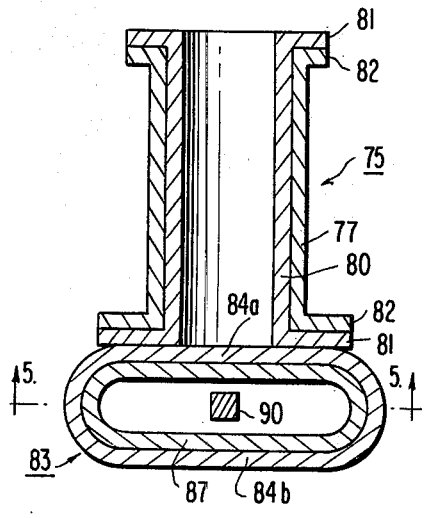
FIG. 4 is a sectional view of the hitch coupling mechanism taken along lines 4—4 of FIG. 3.

With reference to FIGS. 4 and 5, the swivel 75 has an outer bearing sleeve 77 rigidly secured to the beam 76. Rotatably mounted within bearing sleeve 77 is a journal 80 having a radial flange 81 at each end cooperating with a radial flange 82 at each end of the bearing sleeve to hold the journal against axial movement while permitting rotary movement relative to the sleeve. The rear flange 81 of the journal is rigidly connected, as by welding, to a female coupling member comprised of a hitch receptacle 83 having a front wall 84a and a rear wall 84b. The receptacle 83 is open at the top and bottom and has opposing side walls 85—85 which are tapered inwardly from top to bottom. A male coupling member 86 is comprised of a depending leg 87 having a hollow chamber 87a and a thick bottom wall 88. A pair of detents 89—89 are slidably mounted within a transverse channel in the bottom wall 88 as to engage the underside of the side walls 85—85 when the male member is fully seated and thereby lock the coupling mechanism in its coupled position. The detents 89—89 are spring loaded by compression springs 89a—89a and retractably connected to a vertical shaft 90 by sliding pins 91—91 and interconnecting pivot links 92—92. The lower end of shaft 90 passes through an internal housing 93 and is urged into its locked position by a compression spring 94 which is compressed between the top of housing 93 and a pin 95 passing through the shaft 90 near its lower end. The upper end of shaft 90 is pivotally connected at 90a to a release lever 96 which in turn is pivoted from a fulcrum connection 97 on the upper side of a socket 98 formed integrally with the male coupling member. Socket 98 forms a union with a crossbar 100 which passes through a bore therein and is rigidly connected thereto by welding or the like.

As seen in FIG. 1, crossbar 100 has smooth cylindrical arms on each end extending transversely along an axis perpendicular to the longitudinal axis of the towing vehicle. A steering mechanism housing 102 is slidably mounted at its front end on crossbar 100 by means of a pair of lugs 102 and 103, each having a smooth bore therethrough for receiving and slidingly engaging the projecting arms of the crossbar. The socket 98 is of greater diameter than the crossbar and has raised sides 99 at each end which serve as stops to limit the travel of the lugs longitudinally along the crossbar. The arms of the crossbar are of sufficient length to permit each lug to engage its respective stop before the other lug travels beyond the end of its corresponding arm.

The rear end of the housing 102 is pivotally connected to the front end of the tow bar 72 for relative movement about a vertical yaw axis by means of a pin 104 passing through aligned apertures in an upper tow bar plate 105, an upper panel 106 and a lower panel 107 of the housing 102, and a lower tow bar plate 108. The pin 104 is secured on the underside of the lower plate 108 by means of a nut 109 threaded upon the lower projecting end of the pin. To provide freedom of movement between adjacent surfaces, there is a bearing washer 110 between plate 105 and panel 106 and a bearing washer 111 between lower panel 107 and lower plate 108, as best seen in FIG. 7. Washers 112—112 may also be provided beneath the head of pin 104 and beneath nut 109. The connection at pin 104 provides the only vertical pivot axis between the towing and towed vehicles.

The connection between housing 102 and crossbar 100 provides for pitch movement between the front end of tow bar 72 and the towing vehicle about a horizontal pivot axis coextensive with the crossbar. The rear end of tow bar 72 is connected to the towed vehicle for similar pitch movement about a second horizontal pivot axis by means of pivot connections on axletree 50. More specifically, the left side of axletree arm 54 is pivotally pinned to a rearward extension 115 of a tow bar side beam 116 through a bracket 114 and the right side of axletree arm 54 is pivotally pinned to a rearward extension 120 of a tow bar side beam 121 through a bracket 118. Since the pivot pins extend horizontally, these connections are rigid in the horizontal plane.

Steering Connections

With reference to FIGS. 6 and 7, there is rotably mounted upon the pin 104 a vertical shaft 130 carrying dual steering pulleys 132-132. A pair of cables 134-134 pass through slots 133 in housng 102 and travel around those steering members, one in the groove of each pulley. The cables are secured for rotation with the pulleys by means of a detent ball 136 fitting in a detent 138 cut in the perimeter of each pulley across the pulley groove. The detent ball 136 is swaged to each pulley cable such that the cables will be driven positively in their axial direction upon rotation of the pulleys around pin 104.

The cables 134—134 run rearwardly from each side of pulleys 132—132 toward the trailer wheel assembly 34 as shown best in FIG. 1. On the right side, the cables pass around a pulley 142 rotably mounted upon tow bar side beam 121 by bracket 146, then around direction changing pulleys 148 and 150 rotably mounted upon the right side of axletree 50, and then around a wheel pulley 152 rigidly fastened to an extension 154 of the wheel spindle 46 (all pulleys are of the dual type unless stated otherwise). On the left side, the cables pass around a pulley 160 rotably mounted upon tow bar side beam 116 by a bracket 164, then around direction changing pulleys 166 and 168 rotably mounted upon the left side of axletree 50, and then around wheel pulley 168 rigidly fastened to an extension 170 of wheel spindle 42. The dual cables 134—134 are preferably continuous with the right and the left runs being integrally connected after passing around the wheel pulleys 152 and 168, respectively. The cables are positively connected to the wheel pulleys to preclude slippage, pulley 152 by swaged ball and detent connection 170 and pulley 168 by swaged ball and pulley detent connection 172. These ball and detent connections are the same as those previously described for connecting the cables to the steering pulleys. These connections insure that the cables will positively and accurately transmit the steering input from the steering pulleys to each wheel spindle. For the same reason, the bore of each wheel pulley and the spindle extension to which it is attached are preferably of square or rectangular cross section.

The horizontal pivot or pitch axes between the bracket 118 and tow bar extension 120 and the bracket 114 and tow bar extension 115 are aligned and the cable runs between pulleys 142 and 148 and between pulleys 160 and 166 are substantially horizontal and extend along or near the common pitch axis. With this arrangement, relative up and down movement between the towed and towing vehicles does not introduce any significant steering input to the steerable wheels of the towed vehicle.

In order to control any tendency for the steering assembly to oscillate under dynamic loading or as the various interconnected parts become worn, a steering stabilizer with a dampening medium is preferably provided. In the embodiment of FIG. 1, there is provided a steering stabilizer 180 comprised of a cylinder 182 with a piston 184 slidable in the bore thereof. Cylinder 182 is pivotally connected at 186 to a mounting pedestal 188 mounted on the upper surface of upper axletree arm 53. Piston 184 is pivotally secured at 190 to the wheel pulley 152, the axis of the pivot connection being near the outer rim of the pulley. The dampening medium of the steering stabilizer may be of the hydraulic, pneumatic or friction type, such as conventional shock absorbing devices. It may also include a spring pack arranged to return the steering system to its neutral position where the wheels are directed straight ahead. As a further safety precaution, the wheel pulleys 152 and 168 are connected together by a tie rod 174, the right end of which is pivotally connected to pulley 152 at 176 and the left end of which is pivotally connected to pulley 168 at 178.

Sliding Bar Steering Mechanism

Inside the housing 102 is a cylindrical vacuum chamber 250 rotably mounted on the lower housing wall 107 by means of a pin 260 which also serves as a shaft for a cam member 258. The vacuum chamber has a circular top wall in the form of a disc 252, an arcuate side wall 254, and a circular bottom wall 256. Pivotally mounted upon the disc 252 is the cam 258 which is connected off-center to the cam shaft 260 by means of a horizontal arm 262. The cam shaft extends through the vacuum chamber along its central axis and is secured beneath the lower housing wall 107 by a nut 264 threaded on the shaft's lower end. Mounted within the vacuum chamber and rigidly secured to the cam shaft 260 for movement therewith is a flap 268 extending radially outward and having resilient material 270 arranged around three edges thereof to sealingly engage adjacent surfaces of the chamber walls as shown in FIG. 7. The cylindrical chamber 250 is divided internally into two compartments by a partition 272 which extends between the upper and lower walls of the chamber from the arcuate side wall 254 to the cam shaft 260 which it sealingly engages by means of a resilient strip 273. The internal structural details of the chamber 250 are best shown in the exploded view of FIG. 9.

Pivotally mounted at 274 upon the circular disc 252 is an elongated cam follower 276 having a hollow 277 cut in its underside to receive cam 258 and define a cooperating cam surface 278. The cam is preferably circular in shape and the cam surface 278 has the shape shown in dotted outline in FIG. 6. The cam follower is also connected to the steering pulleys 132 by means of a steering link 280 pivotally connected at 282 to the upper side of the cam follower and at 284 to the upper side of upper pulley 132, all as shown in FIG. 7.

With reference to FIG. 6, the vacuum chamber also includes an arm 286 which projects forwardly from disc 252 and is pivotally connected at 288 to one end of an offset link 290. The other end of offset link 290 passes through a slot 291 in housing 102 and is pivotally connected at 292 to a rearwardly projecting cam 294 on a collar 296. Collar 296 is rotably secured to the right end of the crossbar 100 by means of a bolt 298 which permits the collar to pivot with housing 102 about the axis of the crossbar in response to up and down motion between the tow bar and the towing vehicle (pitch movement).

For purposes of drawing a vacuum on the vacuum chamber 250, a port 300 is provided on one side of the partition 272 and a port 302 is provided on the opposite side of that partition, the ports being attached to a vacuum source by lines 304 and 306, respectively. On the upper surface of the disc 252 are a pair of external stops 310 and 312, one arranged on each side of cam follower 276 to limit its pivotal travel about the pivot connection 274.

With reference to FIGS. 7 and 8, sliding bar mechanism preferably includes a coiled tension spring 316 connected between a slotted peg 317 depending from lower housing panel 107 and a slotted depending extension 318 of cam shaft 260. Spring 316 is arranged to return flap 268 and the other mode shifting components, including cam follower 276, to their forward mode position upon removal of vacuum from the reversing chamber served by port 302. In addition, cam follower 276 may be locked in the forward mode position by a locking plate 315 with an abutment 315a on each end. When the plate is seated, one abutment fits against the cam follower and the other against stop 312 to hold those elements apart as shown in FIG. 6. Plate 315 is biased toward its seated locking position by a compression spring 314 and is secured to a pin 313 arranged to raise the plate against spring tension and free the cam follower for pivotal movement.

The steering inputs generated by this steering mechanism will now be described. The axis of the pin 104 constitutes the vertical yaw axis about which the towed vehicle pivots relative to the towing vehicle. Such pivotal movement results in a change in the angle between the longitudinal axes of the towing and towed vehicles. Since this angle change is independent of lateral movement between the towed and towing vehicles, the cylindrical chamber 250 and the steering link 280 behave as a solid member rigidly secured to the mechanism housing 102, the effect being the same as if the pivot connection 284 were to be made directly between the pulleys 132 and the housing. Thus, as the towing vehicle rotates relative to the towed vehicle about the vertical axis of pin 104, the pulleys 132 are caused to rotate about the same axis such that a moment arm exists between that axis and the axis of pivot connection 284. This moment arm produces an angle steering input to the front wheels of the towed vehicle in proportion to the angle change between the longitudinal axes of the vehicles.

For purposes of describing the offset steering input, the rotational axis of the chamber 250, which is the same as the pivot axis of cam 258, is designated 263 and the pivot axis of the connection 282 between cam follower 276 and steering link 280 is designated 283. Now with reference to FIG. 6, which shows the steering mechanism in its forward mode, the lugs 103—103 of housing 102 are free to slide laterally back and forth along the smooth surface of the crossbar 100 in response to any lateral offset between the longitudinal axes of the towing and towed vehicles. Since crossbar 100 is perpendicular to the longitudinal axis of the towing vehicle, the lateral distance between the chamber center line and the crossbar collar 296 will change upon a change in lateral offset between the two vehicles. As the periphery of the disc 252 is attached to the collar 296 by link 290, such offset movement causes the chamber 250 to rotate around its axis 263 which in turn imparts an offset steering input to the pulleys 132 through link 280. The magnitude and direction of that offset input is dependent upon the length and direction of extension of a moment arm existing between chamber axis 263 and steering link pivot axis 283. In the forward mode, the direction of the moment arm is to the left or chamber axis 263 such that clockwise rotation of chamber 250 in the direction of arrow "A" produces clockwise rotation of the pulleys 132 in the direction of arrow "B" as illustrated in FIG. 6.

The offset input of the steering mechanism in its reverse mode for vehicle backing is illustrated in FIG. 8. To shift from forward to reverse mode, vacuum is applied through port 302 causing the sealed flap 268 to swing counterclockwise from the position shown in FIG. 6 to that shown in FIG. 8. Since the cam arm 262 is attached to the same rotational shaft as flap 268, movement of the flap causes shifting of the cam 258 and corresponding movement of the cam follower 276 from its forward position against stop 310 to its reverse position against stop 312, with the follower 276 pivoting about the connection 274.

The reverse mode of the sliding bar steering mechanism is shown in FIG. 8. The moment arm existing between chamber axis 263 and steering link axis 283 is now to the right of the chamber axis. Clockwise movement of the disc 252 in the direction of arrow "C" will therefore produce counterclockwise rotation of the steering pulley 132 in the direction of arrow "D". As discussed more fully below, offset movement of pulleys 132 in a rotational direction opposite to that of disc 252 will produce an offset input in the same direction as the angle input for a turn in a given direction. The offset and angle steering inputs are therefore additive in the reverse mode.

When it is desired to return the steering mechanism to its forward mode, vacuum is removed from port 302 and reapplied to port 300, causing flap 268 to again assume the position shown in FIG. 6. The preferred source of vacuum for the ports 300 and 302 is that available from the intake manifold of a combustion engine where such provides the motive power of the towing vehicle. A conventional valving mechanism (not shown) can be used to alternately switch one port to the vacuum source and the other to atmospheric pressure. As a safety precaution, the valving mechanism may be interconnected with the gear shifting assembly of the towing vehicle to keep reversing port 302 open to atmospheric pressure at all times except when the gear shift layer is in reverse. The return spring 316 will then insure that the shifting mechanism remains in its forward mode position while towing at highway speeds regardless of whether any negative pressure is available to draw a vacuum through forward mode port 300.

The effect of the steering inputs upon the steerable trailer wheels 34 during vehicular turning movements will now be described with reference to FIGS. 10, 11, 12a through 12d, and 13a through 13d. In these figures, vehicular travel in the forward direction is indicated by arrow "V" and in the rearward direction by arrow "W".

Figure 10:
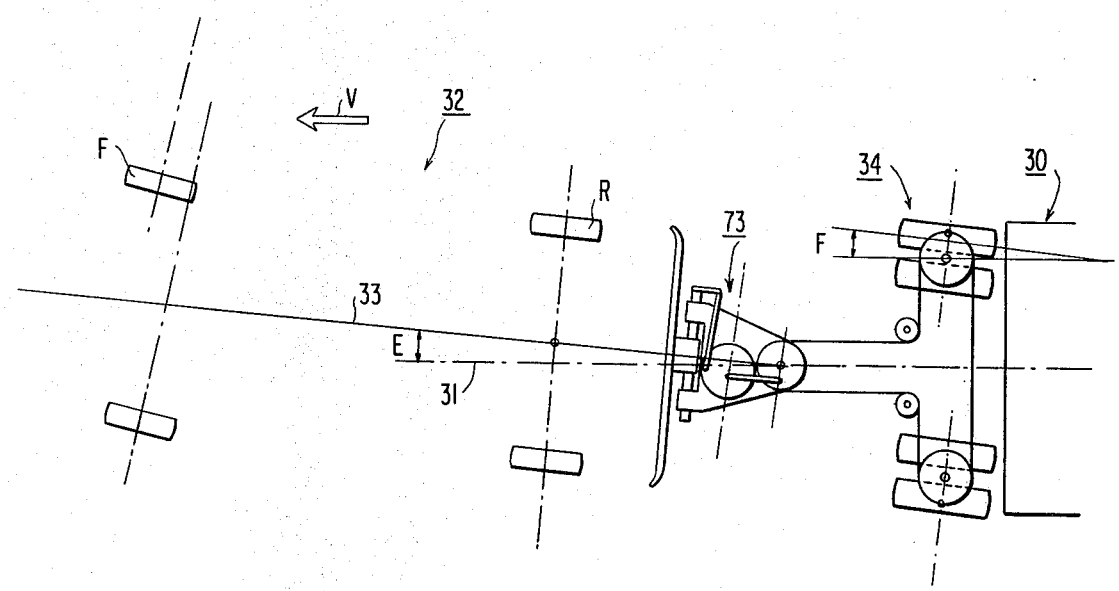
FIG. 10 is a diagramatic illustration of angle steering with the invention.
Figure 11:
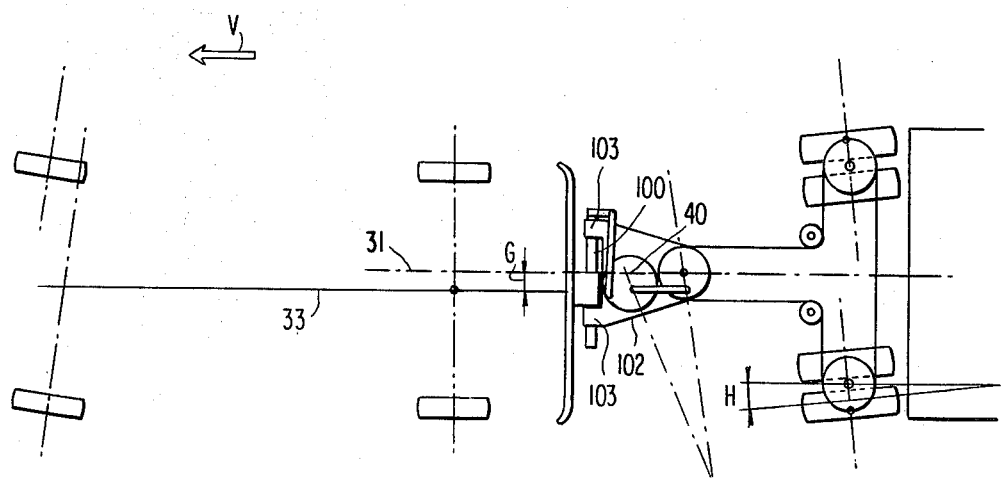
FIG. 11 is a diagramatic illustration of offset steering with the invention.

FIG. 10 shows a sliding bar steering mechanism in its forward mode and illustrates the response of the steerable wheels 34 to angle input only. The angle input for a right turn is represented by the acute angle "E" between the longitudinal axis 31 of the towed vehicle 30 and the longitudinal axis 33 of the towing vehicle 32. The angle input "E" turns the front wheels of the towed vehicle through an angle "F" relative to the towed vehicle axis 31. With reference to FIG. 11, an offset distance "G" measured laterally between the towed vehicle axis 31 and the towing vehicle axis 33 turns the towed vehicle wheels through an angle "H" relative to the towed vehicle axis 31. The direction of the offset "G" corresponds to the same right turning movement that generated the angle input of FIG. 10. This offset of produced when the rear bumper of the towing vehicle swings to the left upon initiation of a right turn. This offset in turn causes the arms of the crossbar 100 to slide to the left through the lugs 103-103 relative to the center line 40 of the steering mechanism housing 102.

It is to be understood that FIGS. 10 and 11 are for purposes of separately illustrating the angle and offset inputs for a relatively sharp turn at low speeds and that the net effect upon the wheels 34 during an actual turning movement is the sum of the two inputs. As described further below, the angle input predominates as this type of turn progresses and, when a steady state turn is achieved, the offset input has gone to zero.

The offset input in the forward mode serves a dual function. A particularly important feature of the invention is that the direction of steering angle "H" in FIG. 11 is opposite to that of steering angle "F" in FIG. 10. The steering components are sized and adjusted relative to each other so that offset input will cancel about 3 to 5 degrees of the angle input during initiation of a slow speed turning movement. By initially cancelling out some of the angle input, turning movement of the trailer will lag that of the towing vehicle by approximately the distance required for the trailer wheels 34 to travel to the location previously occupied by the rear wheels of the towing vehicle. The towed vehicle will thus tend to follow in the path of the towing vehicle and thereby greatly enhance the turning stability of the combination. Additionally, should the towed vehicle become offset relative to the towing vehicle by reason of uneven road surfaces or other external forces, such as buffeting by high winds, the sideways displacement of the towed vehicle will automatically turn its front wheels toward the center line of the towing vehicle and bring the vehicles back into alignment. When such alignment is achieved, the center line of the steering mechanism will have returned to its neutral position at the center of the crossbar and no further offset steering input is generated.

Figure 12A:
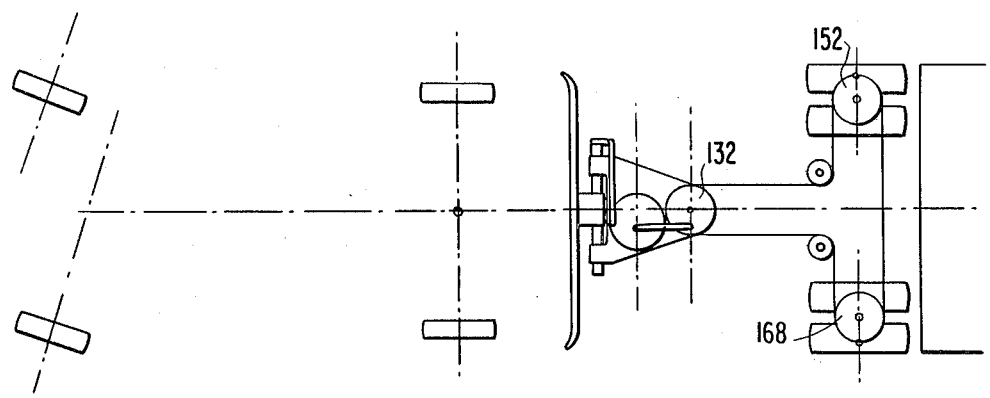
FIGS. 12a, 12b, 12c and 12d are diagramatic illustrations in sequence showing operation of the invention as the towing and towed vehicles negotiate a forward turn to the right.
Figure 12B:
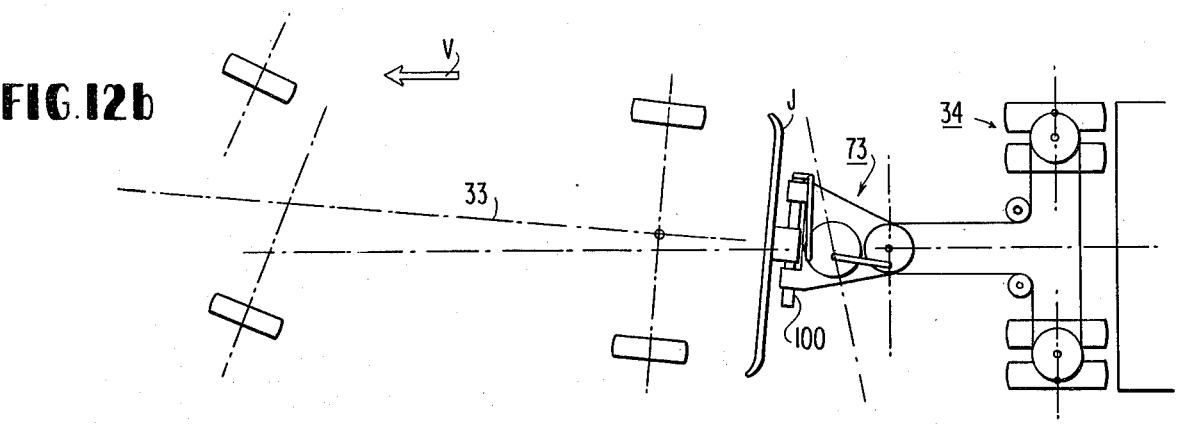

A forward turning movement with the steering mechanism in its forward mode will now be described with reference to FIGS. 12a through 12d. FIG. 12a shows the towing vehicle with its front wheels turned to initiate a right vehicle turn, but before forward movement has commenced. FIG. 12b shows the towing vehicle and the towed vehicle after commencement of forward motion and the first few feet of travel. As the towing vehicle turns to the right, its rear bumper "J" and the crossbar 100 are offset to the left, thereby generating an offset input "G" similar to FIG. 11. The angle input "E" for the same turning movement is similar to that of FIG. 10 such that the two steering inputs cancel and the trailer wheels 34 remain in their straight ahead position.

Figure 12C:
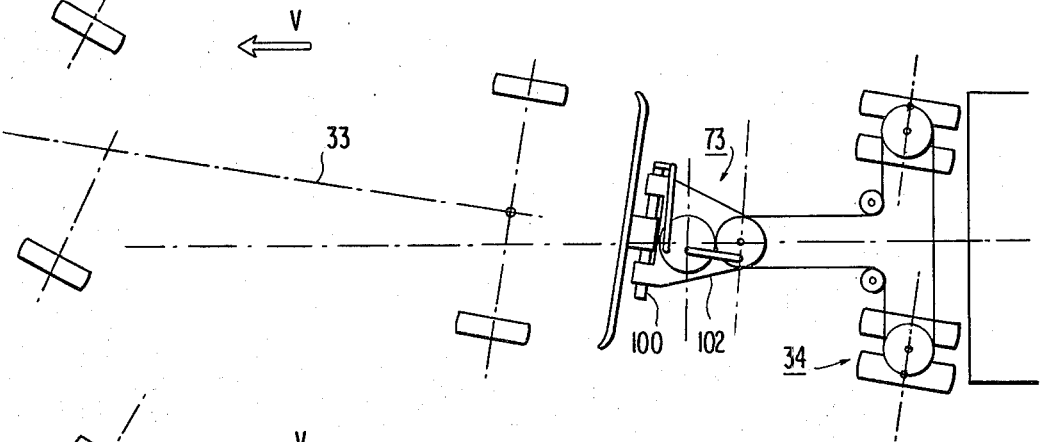
Figure 12D:
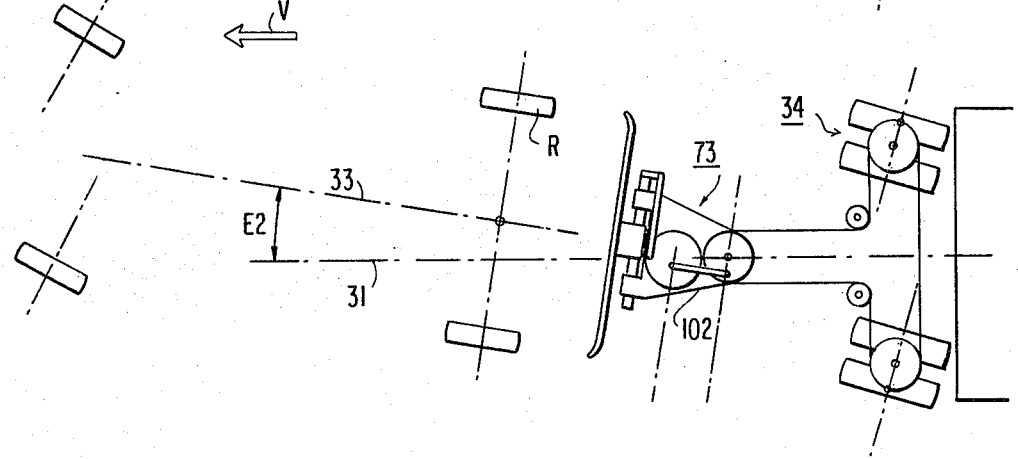

As the right forward turn progresses, the steering mechanism housing 102 will begin to slide back along the crossbar 100 toward the longitudinal axis 33 of the towing vehicle as illustrated in FIG. 12c. This returning movement of the steering mechanism housing is the result of the sharper turning arc initially traversed by the towing vehicle which causes its displacement toward the right side of the towed vehicle. As the relative position of the steering mechanism moves from that of FIG. 12b to that of FIG. 12c, offset input is reduced and angle input commences to turn the trailer wheels to the right. Upon continuation of the turning movement, the housing 102 comes into alignment with the longitudinal axis 33 of the towing vehicle and steering mechanism 73 no longer produces an offset input. Thereupon, the wheels 34 assume their full turning position in response to the full magnitude of angle input "E2" as illustrated in FIG. 12d. This is the steady state turning condition previously described wherein the trailer wheels 34 follow in the path of the rear wheels "R" of the towing vehicle. In other words, the turning radius of the towed vehicle is initially greater than that of the towing vehicle, but as the sliding assembly returns to center, the front wheels of the towed vehicle achieve approximately the same turning radius as the rear wheels of the towing vehicle.

Figure 13A:
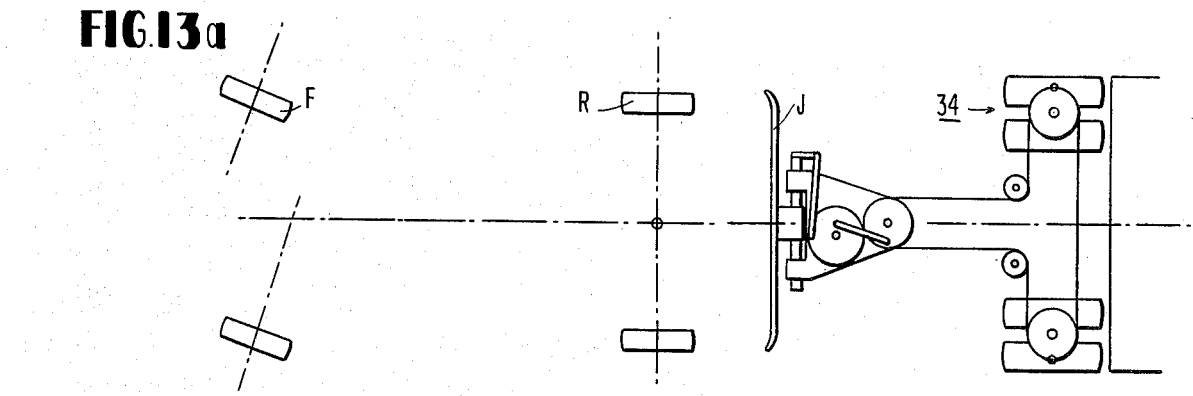
FIGS. 13a, 13b, 13c and 13d are diagramatic illustrations in sequence showing operation of the invention as the towing and towed vehicles negotiate a backing turn to the left (relative to the corresponding sides of the vehicles).
Figure 13B:
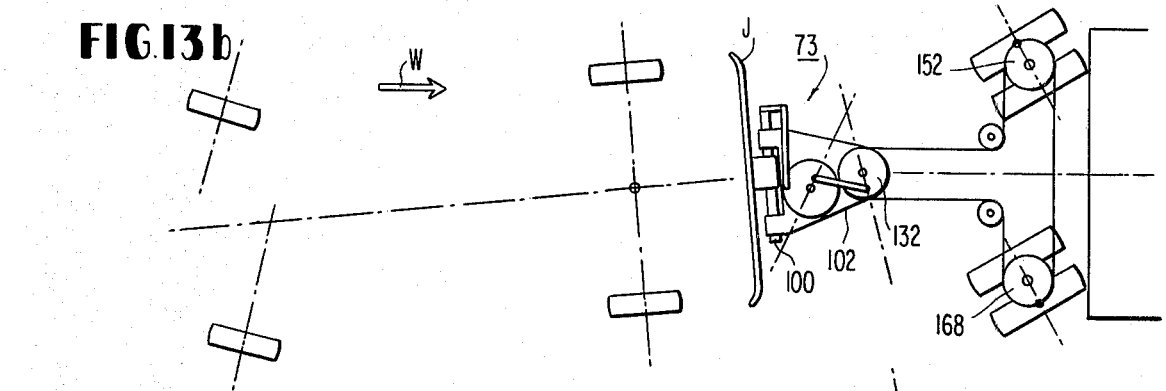
Figure 13C:
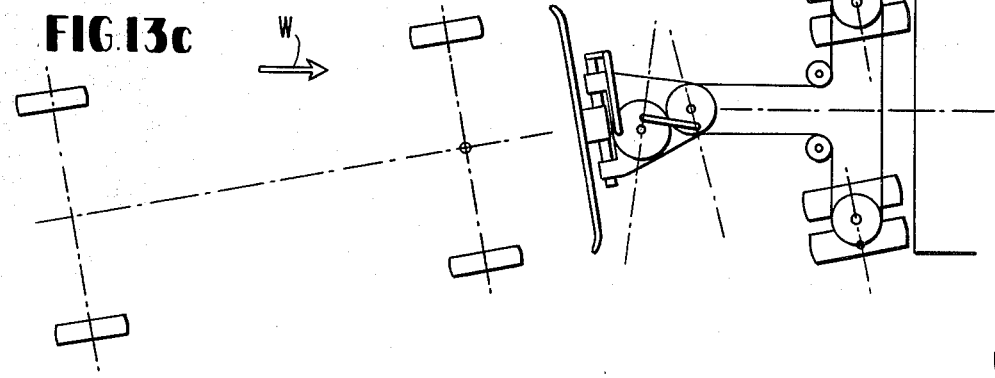
Figure 13D:
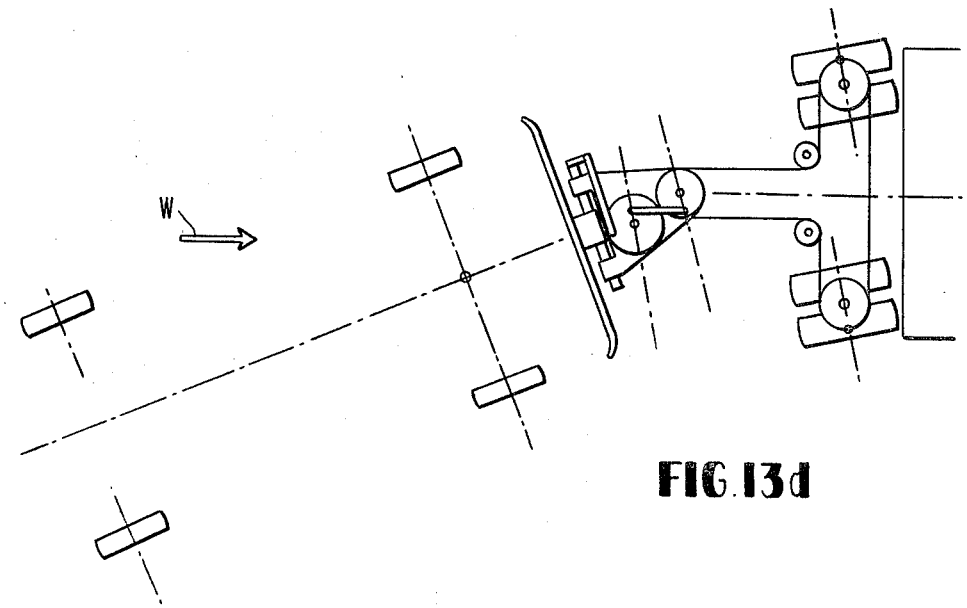

The steering inputs of the sliding bar mechanism in its reverse mode for backing a towed vehicle will now be described with reference to FIGS. 13a through 13d. FIG. 13a shows the towing vehicle with its front wheels "F" turned for initiating a backward turning movement to the left (with reference to the corresponding side of the vehicles), but before backing movement has commenced. It is important to observe that in backing, the front wheels of the towing vehicle must first be turned in a direction opposite to that of the turn to be executed in order to place the rear axle of the towing vehicle on the proper radius of turn. FIG. 13b illustrates initiation of the turn after the vehicles have moved rearwardly for only a short distance of several feet. Initial movement of the towing vehicle throws its rear bumper to the right producing an offset input to the towed vehicle wheels 34. In the reverse mode, as previously explained, the offset and angle inputs from the steering mechanism are in the same direction so that the net input to the wheels 34 is the sum of those two inputs. Offset of rear bumper "J" and the crossbar 100 to the right relative to the housing 102 rotates the steering pulleys 132 in the counterclockwise direction, thereby rotating the wheel pulleys 152 and 168 in the same direction to turn the trailer wheels toward the left. It should be observed that the front wheels of the towing vehicle are still turned to the right in FIG. 13b. Since the angle and offset inputs are additive, the trailer wheels are turned relatively sharply to the left for the first few feet of vehicular travel. This sharp turning of wheels 34 rapidly moves the front end of the trailer to the right as necessary to achieve a common radius of turn with the rear wheels of the towing vehicle. In other words, upon initial backing movment, the offset input is used to "over-steer" the wheels 34 by turning them through an angle greater than that required for the steady state backing turn desired. As the backing motion continues, this over-steering of the towed vehicle returns the steering mechanism housing 102 to its neutral position in alignment with the longitudinal axis of the towing vehicle as illustrated in sequence in FIGS. 13c and 13d. Return of the housing 102 to its neutral position reduces the offset input to zero and a steady state turning radius is achieved. FIG. 13d represents the steady state backing condition wherein the front and rear wheels of both the towed and towing vehicles have achieved approximately the same radius of turn with the rear wheels of the towing vehicle following in the path of the front wheels of the trailer. As well known for a tractor and semi-trailer rig with a fifth wheel connection, the rear wheels of the tractor follow the front of the semi-trailer since those same wheels serve as the front semi-trailer wheels. The present invention therefore provides a semi-trailer type backing movement for the automobile and split-axle trailer combination.

Pivoting Link Mechanism

With reference to FIGS. 14 through 16, there is shown a pivoting link mechanism 320 as an alternative construction for the steering mechanism 73. In this embodiment, the steering pulleys 132 are connected on their right side to a pivoting link 324 by a pin 326 and on their left side to a pivoting link 328 by a pin 330. As best seen in FIG. 16, the pivot pins 330 and 326 are rigidly secured to the upper and lower steering pulleys but are free to move within bores through the rear ends of links 324 and 328, respectively. The forward end of link 324 is pivotally attached to a shifting link 332 by a pivot pin 334. Similarly, the forward end of pivoting link 328 is pivotally secured to a shifting link 336 by means of a pivot pin 338. For added strength, the shifting links 332 and 336 each have a corresponding lower link as shown in FIG. 16. The upper and lower shifting links are spaced relative to the pivoting links by spacer sleeves 342 and 343, each having a bore through which the pin 338 passes to connect together the rear ends of the upper and lower shifting links. The forward ends of pivoting links 324 and 328 have similar bores for pivotally engaging the connecting pins 334 and 338, respectively. The shifting links 332 and 336 are fulcrumed upon the upper wall 345 of a vacuum chamber housing 340 by means of fulcrum pins 346 and 347, respectively. The forward end of shifting link 332 is secured to a rotably mounted plate 348 by a pivotal connecting linkage 350, and the forward end of shifting link 336 is connected to the same rotable plate by a pivotal connecting linkage 354.

The plate 348 is rotably mounted upon housing 340 by a pin 356 to which it is rigidly secured, pin 356 passing through the upper and lower walls of chamber 340 and being connected at its lower end to a similar plate 358. There are similar connecting linkages between the lower shifting links 332 and 336 which operate in the same manner as upper linkages 350 and 354.

Within the vacuum chamber 340 is a partition 360 and a movable flap 362 having one edge rigidly secured to the pin 356 for movement therewith and the other three edges sealingly engaging inner surfaces of the upper chamber wall 345, the lower chamber wall 364 and the arcuate chamber side wall 366. The construction details and operation of vacuum chamber 340 are similar to those of the chamber 250 of FIG. 9. A vacuum can be drawn on one side of the flap 362 by means of a port 368, and on the other side of the flap 362 by means of a port 370, in this instance the ports being located on the upper chamber wall 345. The vacuum chamber 340 is secured directly to the coupling mechanism 74 by means of lugs 372 and 374 and a crossbar 376. However, in this embodiment, the lugs do not slide longitudinally along the crossbar 376 but are pivotally mounted for movement only about a pitch axis by means of pivot spindles 375 at each end of the crossbar. The central body of the crossbar is of larger diameter than bores in the lugs for receiving the spindles to preclude axial movement relative to the housing 340.

The manner in which the pivoting link mechanism operates to steer the front wheels of the towed vehicle will now be described. For purposes of this description, 380 designates an imaginary bar connecting the pivot points 334 and 338 and extending along a line passing through the pivot axis of each as shown in FIG. 14.

Similarly, 382 designates an imaginary bar connecting the pivot points 326 and 330 along a line passing through the pivot axis of each. Since the pivots 326 and 330 are attached to the steering pulley 132 at a fixed position, the length of imaginary bar 382 is fixed. When the steering mechanism is in either its forward or reverse mode, the length of imaginary bar 380 is also fixed because the shifting links 332 and 336 are held in position by the linkages of the shifting mechanism previously described. Imaginary bar 380 remains perpendicular to the longitudinal axis of the towing vehicle at all times and, in effect, follows the movements of its rear bumper. In the forward mode, the length of bar 380 is shorter than that of bar 382.

With reference to FIG. 14, if steering mechanism 320 moves to the left relative to tow bar 72 by an offset "K", as measured between the center line position of pivot pin 104 and its offset position 104', pivot connection 326 will move to position 326' and pivot connection 330 to position 330'. This causes the imaginary bar represented by line 382 to pivot to position 382' and steering pulley 132 to rotate through an angle "L". Angle "L" is the offset input to the steering pulley 132 and is proportional to the offset "K" which corresponds to the lateral distance between the longitudinal axes of the towing and towed vehicles. This offset occurs during the first few feet of vehicular movement into a right forward turn and tends to turn the trailer wheels to the left the same as illustrated in FIG. 11. Movement of the steering pulley and pivoting links during that portion of the turn is illustrated in dotted outline. The corresponding relative movement between the steering mechanism and the low bar is not shown to avoid crowded lines. An angle steering input in the opposite direction corresponding to that of FIG. 10 is also generated during an actual turning movement as discussed in connection with the sliding bar embodiment. Similar to the sliding bar mechanism, the angle input of the pivoting link mechanism is the same as if the shifting links, the pivoting links, and the steering pulleys are considered as being a single rigid member pivotally connected to the tow bar 72 at the pin 104.

The pivoting link mechanism has the same stability enhancing features in the forward mode as does the sliding bar mechanism. Thus, forward travel of the towed vehicle will closely track that of the towing vehicle. Similarly, as illustrated in FIG. 14, lateral displacement of the towed vehicle will produce a steering input turning its front wheels toward the center line of the towing vehicle so as to bring the longitudinal axes of the two vehicles back into alignment.

FIG. 15 shows the pivoting link steering mechanism 320 in its reverse mode. The shifting links 332 and 336 have been moved to the reverse mode position shown by the application of engine vacuum to port 368 instead of port 370, causing flap 362 to move from its position in FIG. 14 to its position in FIG. 15. Corresponding movement of the shifting links has the effect of extending the length of imaginary fixed bar 380, such that its effective length is now greater than the length of imaginary bar 382 at the steering pulley. In this mode, relative movement of the steering mechanism to the right of the tow bar in response to an offset "M" between the axes of the towing and towed vehicles causes the pivoting links 324 and 328 to move the pulley connection 326 to the position 326" and the pulley connection 330 to the position 330". This movement in turn pivots imaginary bar 382 to position 382" and causes the steering pulley 132 to rotate through an angle "N". The offset input thus produced is in the same direction as the angle input for a backing left turn of the towed vehicle, the offset and angle inputs being additive in the same manner as illustrated in FIG. 13b. Thus, if the steering mechanism 320 moved to the right relative to the towed vehicle, the steering pulley 132 would assume the position shown in dotted outline in FIG. 15. Addition of the offset and angle steering inputs upon initiation of a backing turn will produce the rapid turning movement of steerable wheels 34 and move the towed vehicle into the proper turning radius as previously discussed in connection with FIG. 13b.

Extension of the imaginary bar 380 as the shifting mechanism moves from its forward to reverse mode position is the same as if bar 380 were a real component comprised of a piston slidable within a cylinder mounted on the towing vehicle. The free end of the piston would be attached at pivot 334 and the free end of the cylinder at pivot 338. In fact, such a pneumatically or hydraulically operated piston and cylinder arrangement may be one alternative to the actuating mechanisms shown. As long as the distance between pivots 334 and 338 is less than the distance between the pivots 326 and 330, the longitudinal axes of pivoting links 324 and 328 diverge toward the steering pulleys and offset input to the steering member will be in the direction opposite to that of angle input during nonsteady state turning maneuvers. If those distances are the same, no offset input will be produced by offset between the towing and towed vehicles. When the distance between pivots 334 and 338 is greater than the distance between pivots 326 and 330, the longitudinal axes of pivoting links 324 and 328 converge toward the steering pulleys and the offset and angle inputs will be in the same direction during such maneuvers.

In the preferred embodiment, the angle of convergence is approximately 12 degrees and the angle of divergence is approximately 30 degrees as measured in the neutral or centered position for travel in a straight line with the links symmetrical to the center line of the mechanism. With reference to FIG. 16, an annular disk or spacer ring 385 is preferably carried by pulley shaft 130 in the space between upper and lower steering pulleys 132-132. The disk 385 serves as a stop to limit the offset travel of tow bar 72 relative to steering mechanism 320 by engaging the inside edge of link 324 upon maximum offset to the right and the inside edge of link 328 upon maximum offset to the left. The periphery of disk 385 stops inward travel of each pivoting link when its angle relative to the center line reaches a maximum of about 40 degrees. Excessive offset might otherwise lead to undesirable steering geometries.

The sliding bar arrangement previously described is preferred over the foregoing pivoting link mechanism because surge forces between the vehicles sometimes tend to produce steering oscillations with the latter arrangement. Although such oscillations are eliminated by use of the dampening stabilizer 180 shown in FIG. 1, steering control may be more reliable with the sliding bar mechanism.

Hydraulic Shifting Mechanism

Figure 17:
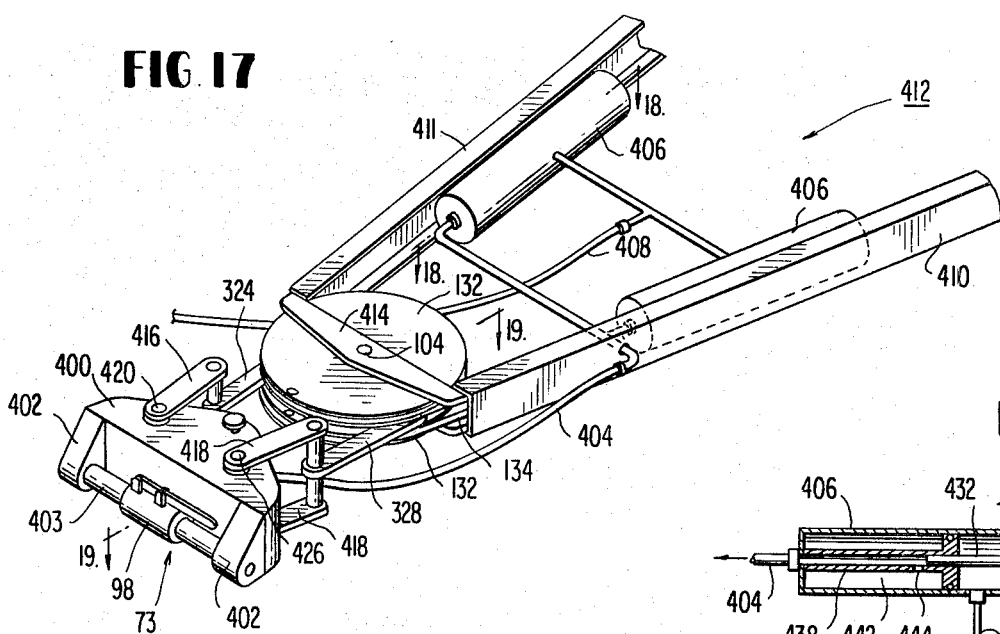
FIG. 17 is a perspective view of a modification of the mode shifting mechanism of the invention.

An hydraulic shifting mechanism for the pivoting link steering mechanism is illustrated in perspective in FIG. 17. The shifting mechanism has a housing 400 secured to the coupling mechanism 73 by a pair of lugs 402-402 which are pivotally mounted upon a crossbar 403 and secured against axial movement in the same manner as the housing 320 of FIG. 15. Pressurized hydraulic fluid is supplied to the housing 400 through a line 404 running from a pair of vacuum operated hydraulic cylinders 406-406. The cylinders are connected to engine vacuum through line 408. Although they can be mounted upon the towing vehicle or elsewhere upon the towed vehicle, cylinders 406-406 are preferably mounted within side beams 410 and 411 of a tow bar assembly 412. The steering pulleys 132-132 are mounted at the forward end of the tow bar by the pin 104 which is secured between upper and lower plates 414-414 attached across the forward ends of the side beams 410 and 411. In this embodiment, pivoting link 324 is pivotally connected to a pair of shifting links 416-416 and pivoting link 328 is pivotally connected to a pair of shifting links 418-418.

Figure 19:
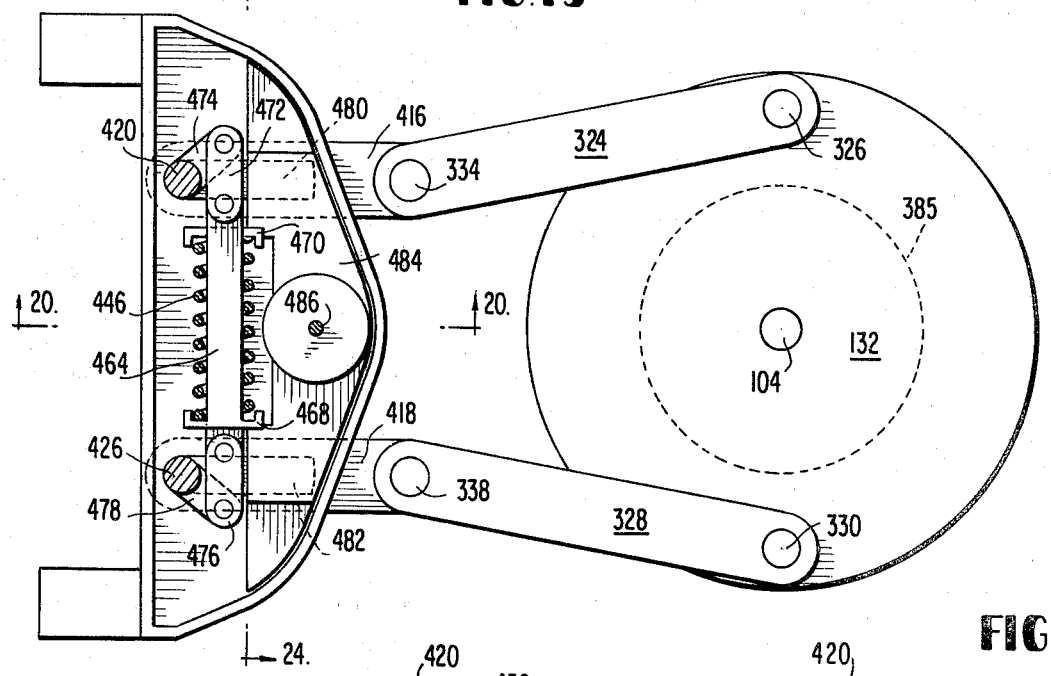
FIG. 19 is a sectional view of certain components of the modified shifting mechanism as taken along lines 19—19 of FIG. 17 and showing the movable components in their forward mode position.

As shown best in FIG. 19, the forward ends of links 416-416 are rigidly connected to a vertical shaft 420 extending through the housing 400 so as to connect both the upper and lower links of the pair for pivotal movement relative to the housing, the upper and lower links being secured against bearing washers 422-422 by nuts 424-424 threaded upon opposite ends of shaft 420. The shifting links 418-418 are similarly secured to and mounted for rotation with a vertical shaft 426.

Figure 18:
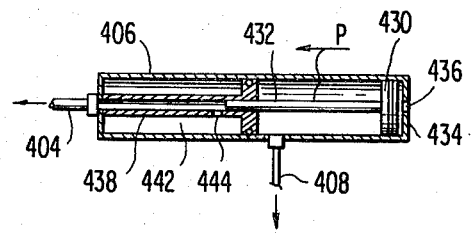
FIG. 18 is a sectional view of certain components of the modified shifting mechanism as taken along lines 18—19 of FIG. 17.

With reference to FIG. 18, there is shown a cross section of the vacuum operated hydraulic cylinder 406 taken along a line 18-18 in FIG. 17. Vacuum drawn through the line of 408 causes piston 430 and its shaft 432 to move in the direction or arrow "P", cylinder end 434 being open to the atmosphere through vent 436. The end of the shaft 432 opposite from piston 430 slides within an internal hydraulic cylinder 438 and acts as a plunger to compress hydraulic fluid therein and force hydraulic fluid through the line 404 to pressurize an hydraulic actuator cylinder 440 within the housing 400, cylinder 440 being arranged to actuate the mode shifting linkages as described below. Cylinder 406 has an hydraulic fluid reservoir 442 connected to the internal bore of cylinder 438 through a passage 444.

Figure 21:
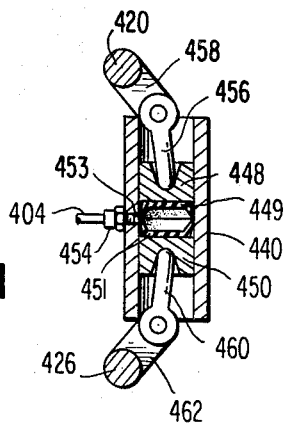
FIG. 21 is a sectional view of certain components of the modified shifting mechanism as taken along lines 21—21 of FIG. 20 and showing the movable components in their forward mode position.
Figure 20:
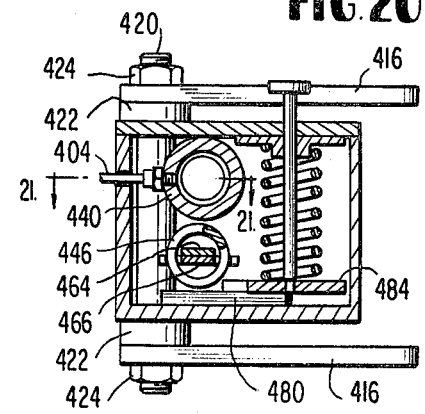
FIG. 20 is a sectional view through the housing of the modified shifting mechanism as taken along lines 20—20 of FIG. 19.

With reference to FIGS. 19 and 20, the mode shifting mechanism internal to housing 400 includes the hydraulic cylinder 440 for shifting the links 416 and 418 into their reverse mode positions, and a coiled return spring 446. Sealingly engaging the internal bore of cylinder 440 are two piston heads 448 and 450 arranged with resilient seals 449 and 451, respectively, in opposing relationship on opposite sides of an hydraulic fluid passage 453 connected to line 404 by a coupling member 454, all as shown in FIG. 21. The piston head 448 is connected through a pivotal link 456 to a piston arm 458 welded to or integrally formed with the shaft 420. Similarly, the piston head 450 is connected to the shaft 426 through a pivotal link 460 and a piston arm 462.

Inside the spring 446 and running down the axis of its coil are an upper sliding plate 464 and a lower sliding plate 466, plate 464 having hooked projections 468 extending transversely to either side thereof to retain the left end of the spring, and plate 466 having hooked projections 470 extending transversely to either side thereof to retain the right end of the spring. The right end of plate 464 is pivotally connected to a link 472 which in turn is pivotally connected to a spring arm 474 welded to or integrally formed with the shaft 420. Similarly, the left end of lower plate 466 is pivotally connected to the shaft 426 by a pivotal link 476 and a spring arm 478 as best shown in FIG. 19. Also internal to the housing 400 is a locking arm 480 rigidly attached to the shaft 420 and a locking arm 482 rigidly attached to the shaft 426. The locking arms 480 and 482 extend outward adjacent to the bottom wall of the housing so that their outer ends can be detachably engaged by a transversely extending locking plate 484 as described further below.

Figure 22:
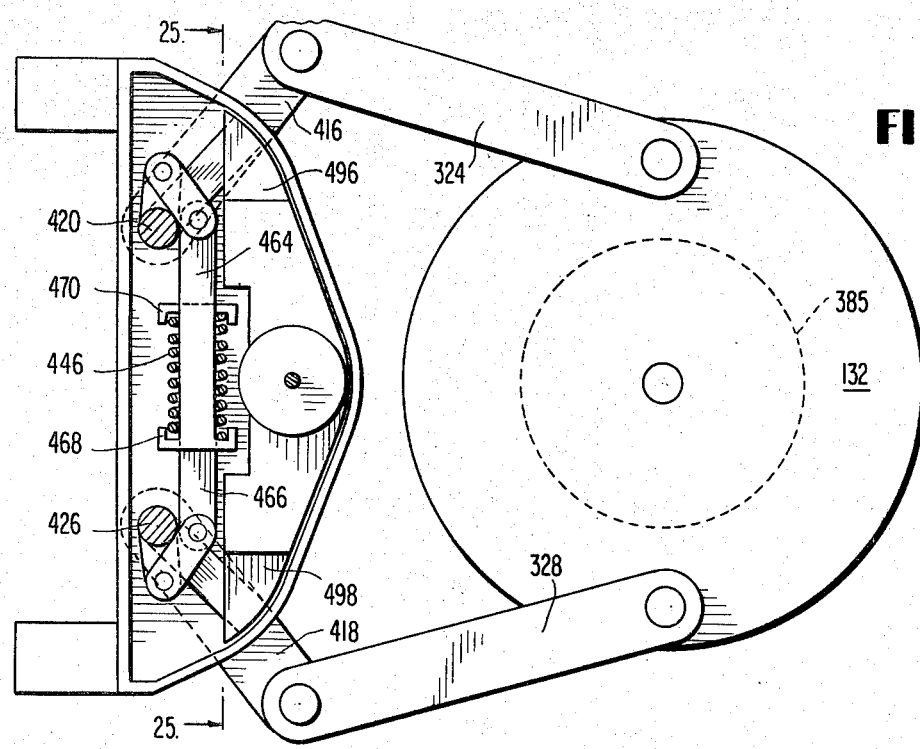
FIG. 22 is a sectional view similar to FIG. 19 with the modified shifting mechanism in its reverse mode.
Figure 23:
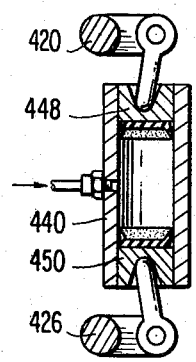
FIG. 23 is a sectional view similar to FIG. 21 with the modified shifting mechanism in its reverse mode.

The hydraulic pistons, the spring plates, and the linkages interconnecting those components to the shifting arms 416 and 418 are shown in their forward mode position in FIGS. 19 and 21. The reverse mode position of those components is shown in FIGS. 22 and 23. When hydraulic fluid is supplied under pressure from the cylinders 406-406 to the cylinder 440, pistons 448 and 450 move apart to the position shown in FIG. 23, causing shafts 420 and 426 to rotate and the arms 474 and 478 to pull the plates 464 and 466 axially in opposite directions, thereby compressing the spring 446 into the position shown in FIG. 22. The same rotational movements of the shafts 420 and 426 move the shifting links 416 and 418 to their reverse mode positions. Upon removal of vacuum from the cylinders 406-406, the compressive force of spring 446 rotates shafts 420 and 426 in the opposite direction and returns shifting links 416 and 418 and other connected linkages to their neutral or forward mode positions. In so doing, the piston heads 448 and 450 are moved together and return to the positions shown in FIG. 21, thereby forcing hydraulic fluid in cylinder 440 to return to the cylinders 406-406. The returning fluid moves piston 430 back to the position shown in FIG. 18 and flows into reservoir 442 as passage 444 is opened.

Figure 24:
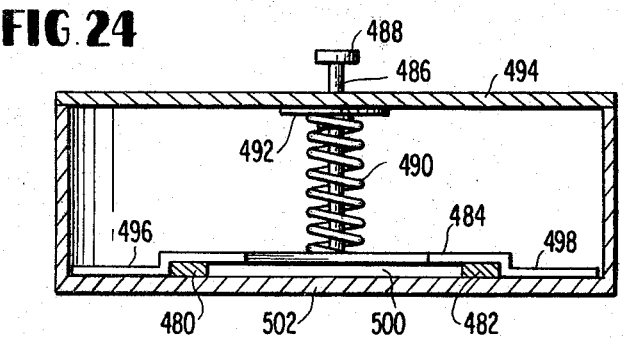
FIG. 24 is a sectional view taken along lines 24—24 of FIG. 19 showing locking components of the modified shifting mechanism in their forward mode position.
Figure 25:
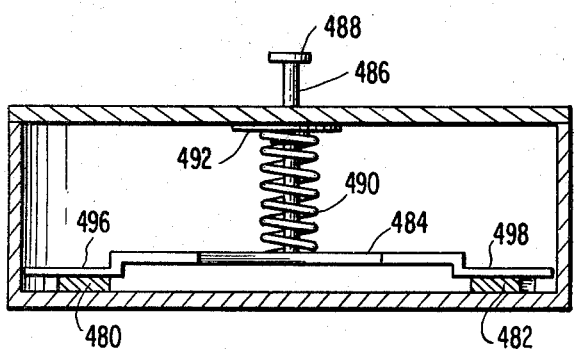
FIG. 25 is a sectional view taken along lines 25—25 of FIG. 22 showing the locking components of FIG. 24 in their reverse mode position.

The operation of the locking arms 480 and 482 and their cooperation with locking plate 484 is illustrated in FIGS. 24 and 25. The locking mechanism includes a vertically reciprocating shaft 486 secured at its lower end to plate 484 and at its upper end to a pull knob 488. Plate 484 is urged toward its seated position against lower wall 502 of housing 400 by a coiled compression spring 490, which is held between a bearing plate 492 on the underside of upper housing wall 494, and the upper surface of the locking plate. Locking plate 484 has a stepped leg 496 at its right end and a stepped leg 498 at its left end, the stepped portion of each leg defining a hollow 500 beneath the plate 484 for receiving the rearwardly extending portions of locking arms 480 and 482. In the forward mode, the locking arms are received in the hollow 500 and retained there by the stepped portions of legs 496 and 498 which are pressed against lower housing wall 502 by the bias of spring 490 as shown in FIG. 24. Even if vacuum is applied to the cylinders 406-406 and pressurized fluid is supplied to hydraulic cylinder 440, the shafts 420 and 426 cannot rotate until the locking arms are freed by pulling plate 484 upward with knob 488. Such reciprocation of the locking components disengages the legs 496 and 498, thereby allowing the locking arms 480 and 482 to assume their reverse mode position as illustrated in FIG. 25.

Alternate Steering Assemblies

The present invention may be used to provide steering inputs to a wide variety of steerable wheel assemblies for towed vehicles. The pulley steering system is only one of many possible embodiments. Two alternate steering embodiments are shown in FIGS. 26 and 27. The wheel assembly of FIG. 26 is of the two wheel Ackerman type wherein the axle of each wheel is mounted for vehicle turning movement on a spindle 510 rotably carried by a conventional king pin (not shown). Each spindle 510 has a bell crank 512 with the bell cranks of each wheel connected together through arms 514-514 and a tie rod 516. Tie rod 516 may be optionally supported by one or more mountings 518 pivotally connected to the tie rod at one end and pivotally anchored at the other end to the trailer body 30 by brackets 520-520. The tie rod 516 is also connected to a steering plate 522 by a pivotally mounted extension rod 524. In this embodiment, the steering inputs generated by the sliding bar steering mechanism 73 are transmitted to a steering arm 526 by the steering link 280 of vacuum chamber 250. The steering arm 526 replaces the steering pulleys 132-132 of FIG. 1 and is pivoted about the pin 104 which connects the tow bar to the steering mechanism as previously described. The arm 526 is responsive to steering inputs in a manner similar to imaginary bar 382 of FIGS. 14 and 15. Arm 526 is connected to the steering plate 522, which pivots about a pivot connection 523 on the trailer frame, by a push-pull rod 528. The push-pull rod 528 transmits both the offset and angle steering inputs to the steering plate 522 which pivots in response thereto and turns the steerable wheels 34'-34'.

The embodiment of FIG. 27 utilizes both the sliding bar steering mechanism 73 and the steering pulleys 132-132 of the embodiment of FIG. 1. However, in the alternate construction shown, the steering pulley 132 drives a cable 540 around a single, centrally located wheel pulley 542 rotably mounted at 543 on the trailer frame. The wheel pulley 542 is connected through a pivot connection 544 directly to the tie rod 516, the tie rod and remaining components of the wheel assembly being the same as those shown in FIG. 26. In this embodiment, the angle and offset steering inputs are transmitted from the steering pulley 132 to the wheel pulley 542 by the continuous cable 540, which is secured for axial movement with the wheel pulley by a swaged ball and detent connection 546 and with the steering pulley by a swaged ball and detent connection 547. The net steering input to wheel pulley 542 thus turns the towed vehicle wheels 34'-34' through the tie rod 516 and connecting linkages 514, 512 and 510.

The bell crank type of steering system is often referred to as Ackerman type steering. Ackerman steering has the disadvantage of limiting the angle of turn to approximately plus or minus 45 degrees. The pulley steering embodiment of FIG. 1 overcomes this disadvantage by allowing the front wheels to turn through a full arc of 180 degrees, that is, 90 degrees to either side of center. In fact, turns greater than 90 degrees can be accomplished where the length of the tow bar is such as to prevent contact between the body structures of the towing and towed vehicles.

Conclusion

The preferred maximum for linear offset travel of the steering mechanism is 6 to 8 inches on either side of its centered or neutral position. The offset moment arm generated in forward mode by the actuator of each steering mechanism is selected so that this maximum offset input will turn the steerable wheels through angles preferably in the range of 2 to 8 degrees, more preferably 3 to 5 degrees. For the reverse mode, the offset moment arm is selected so that this maximum offset input will turn the steerable wheels through angles preferably in the range of 6 to 24 degrees, more preferably 7 to 12 degrees.

The wheel pulleys are preferably sized to be about 1.67 times larger than the steering pulley. Thus, for a steering pulley 6 inches in diameter, the wheel pulleys should be 10 inches in diameter. The remaining components are sized and pivot points selected to produce preferably a 1 to 1 ratio between angle changes of the towing vehicle relative to the towed vehicle and the angle through which the steerable wheels turn in response to angle input. For example, an angle change of 10 degrees between the vehicles should generate an angle steering input to turn the towed vehicle wheels through 10 degrees of arc in the absence of any offset input. A 1 to 1 ratio between towing vehicle rate of turn and towed vehicle rate of turn is thereby achieved upon reaching steady state turning conditions.

Certain features of the invention are designed to avoid operator error and insure that the steering mechanism is in its forward mode as required for highway travel. Forward travel of the vehicle combination with the mechanism in its reverse mode can cross up the steering assembly and lockup the trailer wheels. This is because the reverse mode offset input is in the wrong direction for forward motion and would turn the trailer wheels away from the center line of the towing vehicle, thereby increasing any offset between the vehicles until the mechanism bottoms out at its maximum offset position. It is therefore preferable to always use a positive biasing means to return the offset actuator to its forward mode position in the absence of vacuum or other reverse actuating force. Specific return springs are shown in FIGS. 6 and 19 and other biasing arrangements will be apparent from those. Forward mode locking devices are also readily utilized with the invention as illustrated by locking pins 313 and 486 of FIGS. 7 and 24, respectively. In addition, a blinking warning light may be mounted on the dashboard in front of the driver's station in the towing vehicle to indicate the reverse mode position of the actuator. The light may be activitated by a pressure switch arranged to turn on in response to negative pressure in the vacuum line to the reversing chamber of the mechanism. Furthermore, the mode selector valving in the vacuum lines from the engine may be directly actuated by the shifting lever for the running gears of the towing vehicle and arranged to connect the reversing line to the vacuum source only when the towing vehicle is in reverse gear.

The specific embodiments of the detailed description are merely examplary of the various embodiments possible and the true scope of the invention is not to be limited to those embodiments but is defined by the claims at the end of this specification. Other embodiments and modifications of the invention will be apparent to those skilled in the art from consideration of this disclosure as a whole.

For example, the mode shifting mechanism may be operated electrically instead of pneumatically or hydraulically as shown. Such an embodiment could employ an electric motor to drive either the cam shaft 260 of FIG. 7 or the shifting link shafts 420 and 426 of FIG. 19 through a worm gear and screw connection. The drive motor could be electrically connected to a battery on the towing or towed vehicle and actuated by a switch at the hitch or located remotely within the towing vehicle.

By way of further example, the offset actuator may be a pickup device comprised of components that generate electrical signals in response to offset between the towing and towed vehicles. Those electrical offset signals could be used to actuate a servomotor or other power steering system for turning the front wheels of the towed vehicle. Similarly, hydraulic or pneumatic units, or a combination of both, could be connected between the towing and towed vehicles as offset pickup devices, which in turn could actuate slave units of the same type connected between the frame and wheel assembly of the towed vehicle so as to turn its front wheels in response to pressure changes generated by offset changes. Such offset actuator and response means could be combinated with an angle actuator and response means of the same type arranged to sense angle changes between the vehicles and turn the wheels of the towed vehicle in response thereto, or with one of the angle steering assemblies shown in the drawings.

It is also to be understood that the invention may be used in combination with wheel assemblies of the axle-steering type. In such embodiments, the front steering wheels of the trailer would be rotatably mounted on each end of a single axle connected to the trailer at its center through a fifth wheel type connection incorporating one or more wheel pulleys mounted for movement with the front axle.

It is possible to use various other embodiments and combinations of the steering and mode shifting mechanisms, the coupling mechanism, the tow bar assemblies, and the trailer wheel assemblies disclosed. A number of other modifications also usable with the present invention appear in the earlier application cited above and that application (Ser. No. 876,995) is incorporated herein by reference as if set forth verbatim. All of the foregoing embodiments and modifications, as well as others apparent to those skilled in the art, are within the contemplation of the present invention.

What is claimed is:

1. A steering assembly for coupling a towing vehicle to a towed vehicle having a rear axle wheel assembly and at least one steerable wheel mounted for turning movement on a forward axle, said steering assembly comprising:

tow bar means for connecting the towed vehicle to the towing vehicle and including a pivot member pivotable relative to one of said vehicles;

a first means for providing an angle steering input manifestation in response to angle signals produced by changes in the angle between the respective longitudinal axes of said towed vehicle and said towing vehicle;

a second means for providing an offset steering input manifestation in response to offset signals produced by changes in the amount of lateral offset between the respective longitudinal axes of said towed vehicle and said towing vehicle, said offset manifestation as provided by said second means being substantially independent of the angle between said respective longitudinal axes and thus also substantially independent of said angle steering input manifestation; and, steering means responsive jointly to both said angle and said offset steering input manifestations for turning said steerable wheel.

2. A steering assembly according to claim 1 wherein said second means includes a first tow bar member, a second tow bar member connected to said first tow bar member so as to permit one of said members to move relative to the other of said members in response to changes in lateral offset between said respective longitudinal axes, and offset actuator means for producing offset signals responsive to relative movement between said first and second tow bar members.

3. A steering assembly according to claim 2 wherein said steering means includes a movable steering member, means connecting said steering member to said forward axle for turning said steerable wheel in response to movement of said steering member, and means for movement of said steering member in response to both said offset signals and said angle signals.

4. A steering assembly according to claim 3 wherein said offset actuator means has a forward mode providing offset signals for movement of said steering member in a direction different from the direction in which said steering member is moved by said angle signals for forward turning movement of said vehicles, and a reverse mode providing offset signals for movement of said steering member in the same direction as moved by said angle signals for rearward turning movement of said vehicles.

5. A steering assembly according to claim 4 wherein said offset actuator means includes a mode changing means for changing said offset actuator means between said forward mode and said reverse mode.

6. A steering assembly according to claim 5 which includes means for operating said mode changing means from a location remote from said tow bar means.

7. A steering assembly according to claim 3 wherein said tow bar means includes means pivotally connecting the towed vehicle to the towing vehicle for relative angular movement about a substantially vertical yaw axis, and wherein said steering member is mounted for rotation about substantially the same axis.

8. A steering assembly according to claim 2 wherein said first tow bar member comprises a bar connected to one of said vehicles and extending transversely to its longitudinal axis and said second tow bar member comprises a shuttle means arranged for sliding movement along said transverse bar in proportion to the amount of lateral offset between the longitudinal axes of the towing and towed vehicles, and wherein said offset actuator means provides offset signals responsive to the position of said shuttle means along said bar.

9. A steering assembly according to claim 3 wherein said offset actuator means includes an offset sensing member mounted for movement in response to relative movement between said first and second tow bar members, and connecting means for movement of said steering member in response to movement of said offset sensing member.

10. A steering assembly according to claim 9 wherein said offset actuator means has a forward mode in which said offset sensing member produces movement of said steering member in a direction different from that produced by said angle signals during forward turning movements of said vehicles and a reverse mode in which said offset sensing member produces movement of said steering member in the same direction as that produced by said angle signals during rearward turning movements of said vehicles.

11. A steering assembly according to claim 10 wherein said connecting means includes a mechanical linkage connecting said offset sensing member to said steering member.

12. A steering assembly according to claim 11 wherein said offset sensing member has a fulcrum movable between a forward moment arm position and a reverse moment arm position and wherein said mechanical linkage is pivotally connected to said fulcrum for movement therewith, said fulcrum being in its forward position when said offset actuator means is in said forward mode and in its reverse position when said offset actuator means is in said reverse mode.

13. A steering assembly according to claim 3 wherein said first tow bar member is mounted for movement with one of said vehicles and said steering member is mounted for movement with the other of said vehicles, and wherein said second tow bar member is comprised of at least one pair of elongated bar links connecting said first tow bar member to said steering member so as to move said steering member in response to changes in offset between said first tow bar member and said steering member.

14. A steering assembly according to claim 13 wherein said offset actuator means has a forward mode in which said elongated bar links produce movement of said steering member in a direction different from that produced by said angle signals during forward turning movements of said vehicles and a reverse mode in which said elongated bar links produce movement of said steering member in the same direction as that produced by said angle signals during rearward turning movement of said vehicles.

15. A steering assembly according to claim 14 wherein each elongated bar link of said pair is spaced transversely apart from the other on opposite sides of an axis extending in the longitudinal direction of the towed vehicle, the longitudinal axes of the links of said pair diverging away from each other in the direction of said steering member when said offset actuator means is in one mode and converging toward each other in the direction of said steering member when said offset actuator means is in the other mode.

16. A steering assembly according to claim 15 wherein the longitudinal axes of said links diverge when said offset actuator means is in its forward mode and converge when said offset actuator means is in its reverse mode.

17. A steering assembly according to claim 11 or claim 14 which includes mode changing means for changing said offset actuator means between said forward and reverse modes.

18. A steering assembly according to claim 17 wherein said mode changing means includes shifting means for changing said offset actuator means between said forward and reverse modes from a location remote from said tow bar means.

19. A steering assembly according to claim 18 wherein said shifting means is operable by a pressure differential across at least a portion thereof.

20. A steering assembly according to claim 19 wherein said pressure differential is provided by a difference between atmospheric pressure and a source of vacuum.

21. A steering assembly according to claim 20 wherein said source of vacuum is provided by a combustion engine in the towing vehicle.

22. A steering assembly according to claim 19 wherein said pressure differential is provided by a difference between atmospheric pressure and a source of pressurized fluid.

23. A steering assembly according to claim 22 wherein said pressurized fluid is a liquid.

24. A steering assembly according to claims 4, 11 or 14 wherein said offset actuator means includes a mode changing means for changing said offset actuator means between said forward and reverse modes, and wherein said mode changing means includes shifting means operable when actuated to move said mode changing means to its reverse mode and when not actuated to return said mode changing means to its forward mode.

25. A steering assembly according to claims 4, 11 or 14 which includes means for changing said offset actuator means between its forward and reverse modes and a locking means with a locked position for retaining said offset actuator means in said forward mode and an unlocked position for allowing said offset actuator means to change between its forward and reverse modes.

26. A steering assembly according to claims 3, 4, 11 or 14 wherein said steering member is mounted for rotation in response to both said offset and angle signals and wherein said steering means includes a spindle mounted upon said towed vehicle for rotation about a substantially vertical axis and carrying said forward axle for turning movement of said steerable wheel upon rotation of said spindle, and transmitting means for rotating said spindle in response to rotation of said steering member.

27. A steering assembly according to claim 26 wherein said transmitting means includes pulley means for rotating said spindle and cable means for transmitting rotation of said steering member to said pulley means.

28. A steering assembly according to claim 27 for a towed vehicle having at least two steerable wheels one adjacent to each side of said towed vehicle and mounted for turning movement on separate forward axles, wherein said steering means includes two of said spindles, each carrying one of said forward axles, and wherein said pulley means rotates both of said spindles in response to rotation of said steering member.

29. A steering assembly according to claim 28 wherein said steering means includes tie rod means for connecting said spindles for rotation together.

30. A steering assembly according to claim 26 wherein said transmitting means includes a bell crank mounted for rotation with said spindle and push-pull means for rotating said bell crank in response to rotation of said steering member.

31. A steering assembly according to claim 1 wherein the direction of wheel turn in response to said angle signals is opposite to the direction of wheel turn in response to said offset signals for forward turning movements of said vehicles.

32. A steering assembly according to claim 31 wherein the direction of wheel turn in response to said angle signals is the same as the direction of wheel turn in response to said offset signals for rearward turning movements of said vehicles.

33. A steering assembly according to claim 32 wherein said steering means includes a spindle mounted upon said towed vehicle for rotation about a substantially vertical axis, said forward axle being carried by said spindle for turning movement of said steerable wheel with rotation of said spindle; a steering member mounted for rotation with said spindle; and means for rotation of said steering member in response to said offset and angle signals.

34. A steering assembly according to claim 1 wherein said steering means includes a movable steering member, means connecting said steering member to said forward axle for turning said steerable wheel in response to movement of said steering member, and means for movement of said steering member in response to said offset signals.

35. Apparatus for coupling a towing vehicle to a towed vehicle having a rear axle and a forward axle supporting at least one steerable wheel, said apparatus comprising:
a coupling means providing for changes in the angle formed between the longitudinal axes of the towing vehicle and the towed vehicle and for changes in lateral offset between said longitudinal axes,
a first sensing means providing a first signal responsive to changes in said angle,
a second sensing means providing a second signal responsive to changes in said offset, and,
actuator means responsive jointly to said first and second signals for steering said steerable wheel.

36. The apparatus of claim 35 in which said actuator means includes output means for combining said first and second signals to produce a joint steering signal and steering means for steering said steerable wheel in response to said joint signal.

37. The apparatus of claim 36 in which said output means comprises a movable member and said first and second signals comprise mechanical input signals each capable of imparting movement to said movable member.

38. The steering assembly of claim 2 or the apparatus of claim 35 which includes stabilizing means for dampening turning oscillations of said steerable wheel.

39. The steering assembly of claim 2 or the apparatus of claim 35 which includes a coupling means for detachably connecting said towed vehicle to said towing vehicle.

40. The steering assembly of claim 2 or the apparatus of claim 35 which includes pitch means for relative movement between said towed vehicle and said towing vehicle about a horizontal pitch axis extending substantially perpendicular to the longitudinal axis of said towing vehicle, yaw means including said pivot member for relative movement between said towed vehicle and said towing vehicle about a vertical yaw axis extending substantially perpendicular to the longitudinal axis of said towing vehicle, and roll means for relative movement between said towed vehicle and said towing vehicle about a horizontal roll axis substantially parallel to the longitudinal axis of said towing vehicle.

41. A steering assembly for coupling a towing vehicle to a towed vehicle having a rear axle wheel assembly and at least one steerable wheel mounted for turning movement on a forward axle, said steering assembly comprising:
tow bar means for connecting the towed vehicle to the towing vehicle and including angle means pivotable relative to one of said vehicles to provide for changes in the angle between the longitudinal axes of said vehicles;
offset means having a first member movable relative to a second member to provide for changes in the lateral offset between the longitudinal axes of said vehicles, relative movement between said first and second members being substantially independent of pivotable movement of said angle means;
offset actuator means for providing offset signals responsive to relative movement between said first and second tow bar members; and,
steering means for turning said steerable wheel in response to said offset signals.

42. The steering assembly of claim 41 which further includes angle actuator means for providing angle signals responsive to pivotal movement of said angle means, and in which said steering means turns said steerable wheel in response to both offset signals and said angle signals.

* * * * *